United States Patent
Imamura et al.

(10) Patent No.: US 10,525,886 B2
(45) Date of Patent: Jan. 7, 2020

(54) DISPLAY SYSTEM, ELECTRONIC MIRROR SYSTEM AND MOVABLE-BODY APPARATUS EQUIPPED WITH THE SAME

(71) Applicant: Panasonic Intellectual Property Management Co., Ltd., Osaka (JP)

(72) Inventors: Norihiro Imamura, Osaka (JP); Shoji Soh, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/986,217

(22) Filed: May 22, 2018

(65) Prior Publication Data

US 2018/0345860 A1 Dec. 6, 2018

(30) Foreign Application Priority Data

| May 31, 2017 | (JP) | 2017-108707 |
| May 31, 2017 | (JP) | 2017-108708 |
| Mar. 5, 2018 | (JP) | 2018-038884 |

(51) Int. Cl.

| *B60R 1/00* | (2006.01) |
| *H04N 7/18* | (2006.01) |
| *G02B 5/10* | (2006.01) |
| *G02B 27/00* | (2006.01) |
| *B60K 35/00* | (2006.01) |
| *G02B 17/06* | (2006.01) |
| *G02B 17/08* | (2006.01) |

(52) U.S. Cl.
CPC ............... *B60R 1/00* (2013.01); *B60K 35/00* (2013.01); *G02B 5/10* (2013.01); *G02B 17/06* (2013.01); *G02B 27/0018* (2013.01); *G02B 27/0025* (2013.01); *H04N 7/183* (2013.01); *B60K 2370/21* (2019.05); *B60K 2370/31* (2019.05); *B60K 2370/334* (2019.05); *B60K 2370/37* (2019.05); *B60R 2300/20* (2013.01); *G02B 17/08* (2013.01)

(58) Field of Classification Search
None
See application file for complete search history.

(56) References Cited

U.S. PATENT DOCUMENTS

| 4,908,611 A * | 3/1990 | Iino ................... B60R 11/02 340/980 |
| 5,037,182 A | 8/1991 | Groves et al. |
| 8,704,892 B2 | 4/2014 | Taguchi et al. |

(Continued)

FOREIGN PATENT DOCUMENTS

| JP | 5-096974 | 4/1993 |
| JP | 2009-120080 | 6/2009 |

(Continued)

*Primary Examiner* — Fernando Alcon
(74) *Attorney, Agent, or Firm* — Greenblum & Bernstein, P.L.C.

(57) ABSTRACT

A display system includes a display unit, a housing, and a reflecting optical system. The display unit displays an image based on a captured image. The housing includes a housing room that houses the display unit and the reflecting optical system. The reflecting optical system reflects the image displayed on the display unit, thereby outputting the reflected image through an opening of the housing to the outside of the housing.

15 Claims, 20 Drawing Sheets

(56) References Cited

U.S. PATENT DOCUMENTS

| | | | | |
|---|---|---|---|---|
| 8,970,794 B2* | 3/2015 | Signore | ................ | G02B 27/027 |
| | | | | 348/832 |
| 2007/0177012 A1* | 8/2007 | Ogawara | ................... | B60R 1/00 |
| | | | | 348/118 |
| 2009/0284598 A1* | 11/2009 | Busch | ...................... | B60R 1/00 |
| | | | | 348/148 |
| 2013/0038730 A1* | 2/2013 | Peterson | ................... | B60R 1/00 |
| | | | | 348/148 |
| 2014/0218804 A1* | 8/2014 | Tanahashi | .......... | G02B 27/0025 |
| | | | | 359/630 |
| 2014/0313586 A1* | 10/2014 | Jan | ..................... | G02B 27/0149 |
| | | | | 359/630 |
| 2016/0129839 A1* | 5/2016 | Kim | .................... | H04N 5/2254 |
| | | | | 348/148 |
| 2018/0201193 A1* | 7/2018 | Sakamoto | ............... | B60R 11/04 |

FOREIGN PATENT DOCUMENTS

| | | | | |
|---|---|---|---|---|
| JP | 2014-010321 | | 1/2014 | |
| JP | 2017024597 A | * | 2/2017 | ............. B60R 11/04 |
| WO | WO-2012165050 A1 | * | 12/2012 | ............. G02B 5/223 |

\* cited by examiner

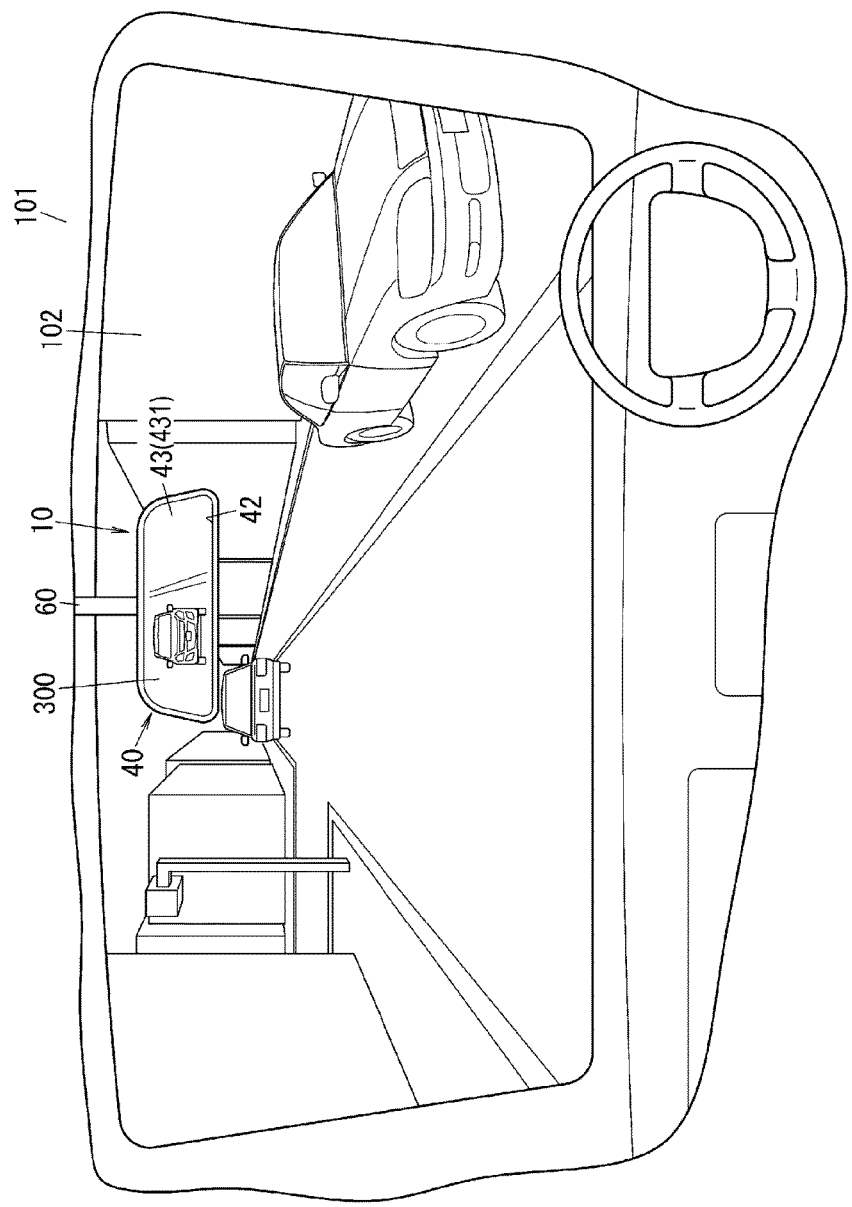

D.C.: Display Controller

DISPLAY SYSTEM, ELECTRONIC MIRROR SYSTEM AND MOVABLE-BODY APPARATUS EQUIPPED WITH THE SAME

BACKGROUND

1. Technical Field

The present disclosure relates to display systems, electronic mirror systems equipped with the display systems, and movable-body apparatuses equipped with the display systems and, more particularly, to display systems that display images based on captured images.

2. Description of the Related Art

A conventional vehicle display apparatus (i.e. display systems and electronic mirror systems) includes a rear camera, a monitor, and a concave mirror. Such a vehicle display apparatus is disclosed in Japanese Patent Unexamined Publication No. 2009-120080 (Patent Literature 1, hereinafter), for example. The rear camera obtains image data of a rearward view of a vehicle. The monitor is disposed at a position on a ceiling between a driver's seat and a front passenger's seat in the interior of the vehicle. The monitor displays an image of the rearward view of the vehicle based on the image data that are fed from the rear camera. The concave mirror is disposed at a position above a windshield in the interior of the vehicle. The concave mirror reflects the image displayed on the monitor so as to show the image of the rearward view of the vehicle to the occupants in the vehicle.

SUMMARY

The present disclosure provides a display system that is more compact than conventional ones, an electronic mirror system that includes the display system, and a movable-body apparatus that includes the electronic mirror system. More specifically, the present disclosure provides a display system, an electronic mirror system, and a movable-body apparatus equipped with the electronic mirror system; such a display and an electronic mirror system are capable of reducing damage thereto which is caused by external light, such as sunlight, incident on a display unit of the display system.

A display system according to a first aspect of the present disclosure includes a display unit, a housing, and a reflecting optical system. The display unit displays an image based on a captured image. The housing includes a housing room that houses the display unit and the reflecting optical system. The reflecting optical system reflects the image displayed on the display unit, thereby outputting the reflected image through an opening of the housing to the outside of the housing.

A display system according to a second aspect of the present disclosure includes a display unit, a magnifying optical system, and an optical attenuator. The display unit displays an image based on a captured image. The magnifying optical system magnifies the image displayed on the display unit, and outputs the magnified image. The optical attenuator attenuates external light that is incident on the display unit through the magnifying optical system.

An electronic mirror system according to an aspect of the present disclosure includes any one of the display systems described above, an imaging unit, and a display controller. The imaging unit outputs a captured image. The display controller causes the display unit to display an image based on the captured image that is output from the imaging unit.

A movable-body apparatus according to an aspect of the present disclosure includes the electronic mirror system described above, and a body to which the electronic mirror system is mounted.

In accordance with the first aspect of the present disclosure, it is possible to provide the display system being made more compact, the electronic mirror system including the display system, and the movable-body apparatus including the electronic mirror system. In accordance with the second aspect of the present disclosure, it is possible to provide the display system and the electronic mirror system each capable of reducing damage thereto which is caused by external light, such as sunlight, incident on the display unit of the display system, and the movable-body apparatus equipped with the electronic mirror system.

BRIEF DESCRIPTION OF THE DRAWINGS

FIG. 4 is a view illustrating an example of the image that is displayed with the display system shown in FIG. 2;

DETAILED DESCRIPTION OF PREFERRED EMBODIMENTS

Prior to descriptions of preferred embodiments of the present disclosure, problems of conventional vehicle display apparatuses will be briefly described. According to the vehicle display apparatus described in Patent Literature 1, a monitor is housed in the inside of an overhead console box that is configured as a body separated from a concave mirror. Accordingly, the size of the vehicle display apparatus is large as a whole. Such a large size of the vehicle display apparatus reduces the space of the interior of the vehicle. For this reason, downsizing of such vehicle display apparatuses is desired.

In the vehicle display apparatus described in Patent Literature 1, if sunlight incident from the outside into the inside of the vehicle reaches the concave mirror, the sunlight may be condensed by the concave mirror. In a case where the sunlight is condensed on the monitor, the monitor is heated locally to a high temperature that causes damage to the monitor.

Hereinafter, embodiments of the present disclosure will be described, with reference to the accompanying drawings. Note that all of the drawings are conceptual figures; therefore, ratios of dimensions such as sizes and thicknesses of constituent elements illustrated in the figures not necessarily reflect corresponding ratios of actual dimensions of the constituent elements. Moreover, in a second embodiment and in each of modified examples of the embodiments, the same constituent elements as those in a first embodiment and in the antecedent modified examples of the embodiments are designated by the same numerals and symbols, and their duplicate explanations are appropriately omitted.

First Exemplary Embodiment

In the first exemplary embodiment, descriptions will be made particularly focusing on downsizing of a display system.

(1) Outline

Figure 1:
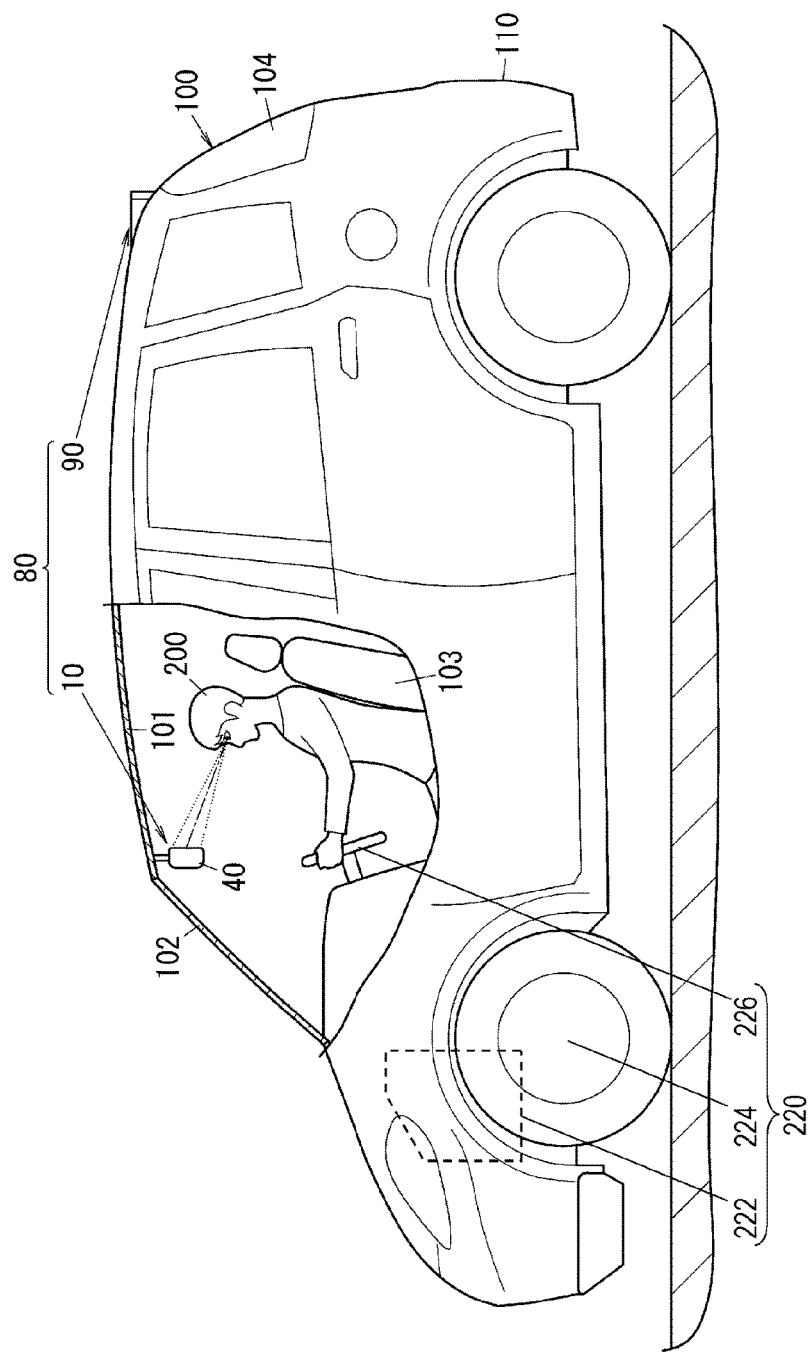
FIG. 1 is a schematic illustrative view of a movable-body apparatus equipped with a display system according to a first embodiment of the present disclosure.

FIG. 1 is a schematic illustrative view of automobile 100 as a movable-body apparatus equipped with display system 10 according to the first embodiment of the present disclosure. Automobile 100 includes body (of the movable-body apparatus) 110 and drive unit 220.

Body 110 configures an inside of automobile 100 therein. Body 110 includes ceiling part 101 and windshield 102. In the inside of automobile 100, seats are disposed including front seats 103 in which users 200 (occupants such as a driver of automobile 100) are seated.

At a rear portion of body 110, imaging unit 90 is disposed to obtain image data of the rearward view of automobile 100. Display system 10 is mounted on the front side of ceiling part 101, near windshield 102, such that display system 10 is positioned to come in sight of user 200 facing forward and being seated in front seat 103. Display system 10 and imaging unit 90 configure electronic mirror system 80. Electronic mirror system 80 is mounted in body 110.

Drive unit 220 is mounted to body 110 and causes body 110 to travel. Drive unit 220 includes drive source 222 such as an engine or a motor, and drive wheels 224. Moreover, drive unit 220 may include steering 226.

Figure 2:
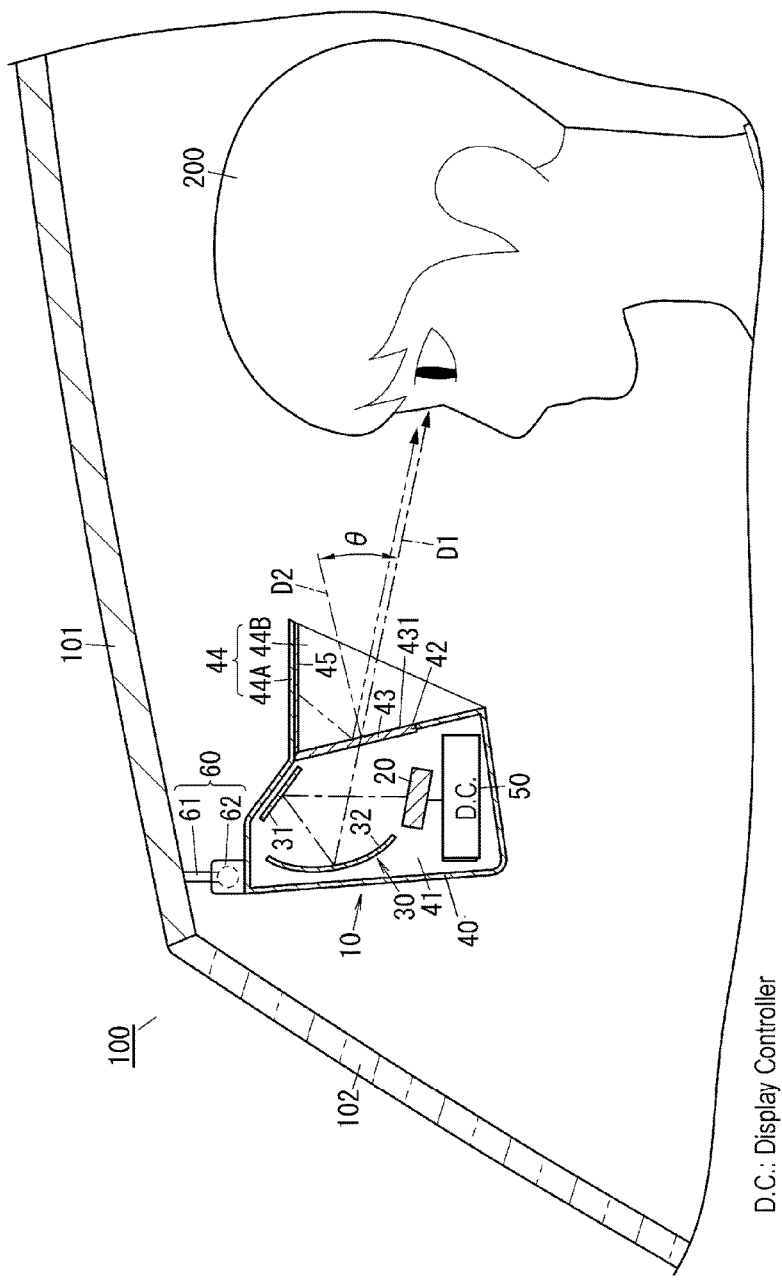
FIG. 2 is a schematic cross-sectional view showing a configuration of the display system according to the first embodiment of the disclosure.
Figure 3:
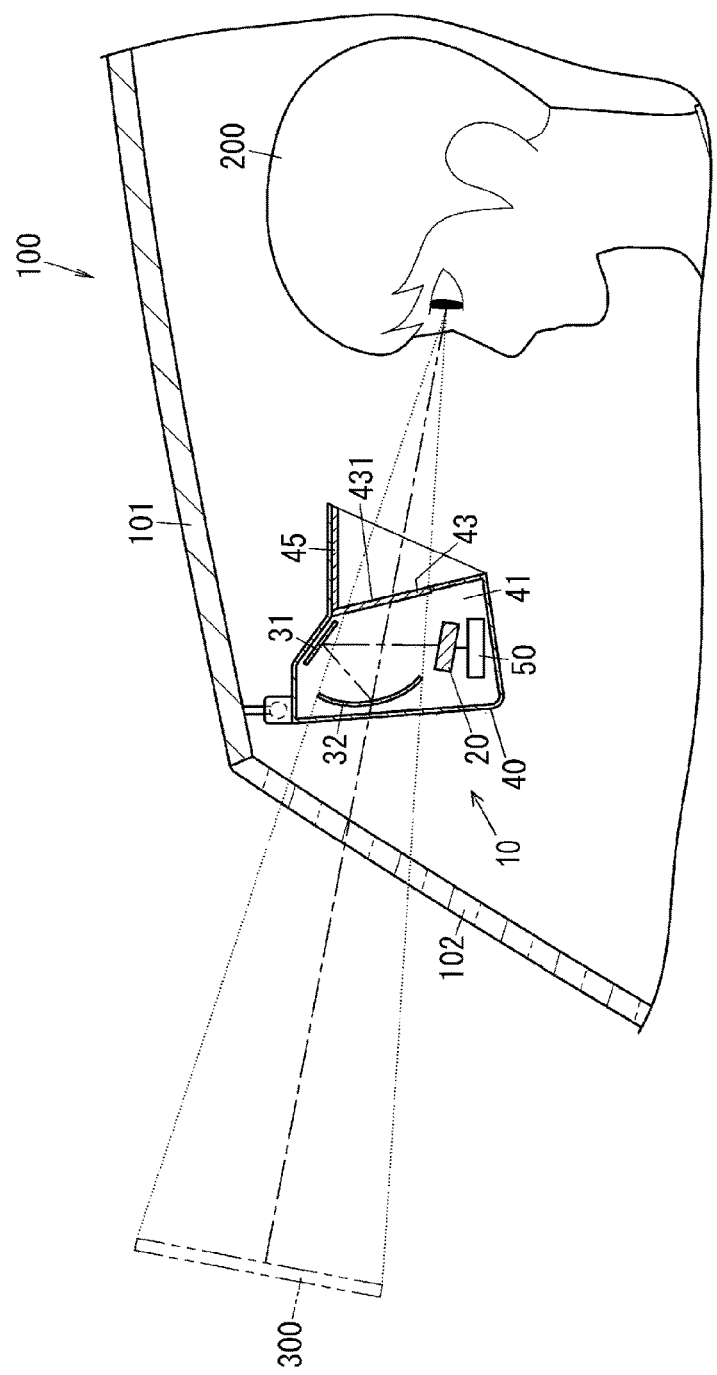
FIG. 3 is an illustrative view of a display position of an image that is displayed with the display system shown in FIG. 2.

FIG. 2 is a schematic cross-sectional view showing a configuration of display system 10. FIG. 3 is an illustrative view of a display position of an image that is displayed with display system 10. Display system 10 includes display unit 20, housing 40, and reflecting optical system 30.

Display unit 20 displays an image based on an image captured with imaging unit 90. That is, display unit 20 displays an image based on image data obtained by imaging unit 90. Housing 40 includes housing room 41 that houses display unit 20 and reflecting optical system 30. Reflecting optical system 30 reflects the image displayed on display unit 20, thereby outputting the reflected image, through opening 42 of housing 40, to the outside of housing 40.

In display system 10, both display unit 20 and reflecting optical system 30 are housed in housing room 41 of housing 40. Therefore, the size of display system 10 can be made small, compared to a case where display unit 20 and reflecting optical system 30 are housed separately in different housings. When an image is displayed on display unit 20, the image (reflected image) reflected off reflecting optical system 30 is visually recognized by user 200 through opening 42. User 200 sees the image reflected off reflecting optical system 30; therefore, the user recognizes the image as if the image on display unit 20 is displayed at a display position that is located more distant than reflecting optical system 30, in the direction in which user 200 can see reflecting optical system 30. That is, as shown in FIG. 3, user 200 sees virtual image 300 of the image displayed on display unit 20 as if virtual image 300 is being displayed at the display position a few meters, e.g. two to three meters, ahead of automobile 100.

Note that the term "outputting" the reflected image through opening 42 to the outside of housing 40, as used herein, means that the light forming the reflected image exits through opening 42 to the outside of housing 40. With this configuration, user 200 can see the image reflected off reflecting optical system 30, through opening 42. Moreover, the distance to virtual image 300 recognized by user 200 is called "apparent distance." Furthermore, the term "display position" of virtual image 300 means the position that is away, by the apparent distance, from user 200 to virtual image 300 in a direction reversely parallel to arrow D1 of FIG. 2. The direction parallel to arrow D1 is the direction (output direction) in which the image reflected off reflecting optical system 30 is output to the outside of housing 40. That is, the "display position" is the virtual position at which virtual image 300 is recognized as if displayed there, as shown in FIG. 3. In FIG. 2, the travelling path of light emitted from a point (a certain pixel) in the image displayed on a display screen of display unit 20 is schematically indicated by an alternate long and short dashed line.

The image displayed on display unit 20 is based on a captured image (or image data) obtained with imaging unit 90. "The image based on a captured image" may be any one of the following images: That is, the captured image obtained with imaging unit 90 as it is, an image that is produced by subjecting the captured image to image processing, and a computer graphics (CG) image that is produced based on the captured image. For example, an image which is captured with imaging unit 90 at nighttime will be dark; therefore, the image captured with imaging unit 90 may be corrected to have higher luminance before it is displayed on display unit 20. Moreover, based on the image captured with imaging unit 90, a CG image, marker, or the like may be produced to indicate an obstacle or the like that can be seen in the captured image. Then, the thus-produced CG image, marker, or the like is overlapped (or superimposed) on the captured image captured with imaging unit 90 to produce another image that is to be displayed on display unit 20. Alternatively, a marker indicating drive-aide information may be superimposed on the captured image captured with imaging unit 90 to produce an image to be displayed on display unit 20. Such drive-aide information may include: vehicle speed information, navigation information, pedestrian information, forward-vehicle information, lane departure information, and vehicle condition information, for example.

(2) Detail

Hereinafter, details of display system 10 will be described.

(2.1) Configuration

As shown in FIGS. 2 and 3, display system 10 includes housing 40, display unit 20, and reflecting optical system 30. The display system further includes display controller 50.

Housing 40 is formed of a synthetic resin molding or the like having housing room 41 in the inside thereof. Housing room 41 houses display unit 20, reflecting optical system 30, and display controller 50.

Housing 40 is attached to ceiling part 101 of body 110 via ball joint 60, and is hung from ceiling part 101. That is, ball joint 60 is a mounting part with which housing 40 is attached to ceiling part 101 that is a part of automobile 100. Display system 10 is disposed at a position where it does not obstruct the forward sight of user 200.

In a rear part of housing 40 (i.e. in a rear wall of housing 40), opening 42 is provided so as to open housing room 41. That is, in housing 40, opening 42 is provided at a position where it faces user 200. The dimension of opening 42 is larger in the left-right direction (the direction orthogonal to both the up-down direction and the front-rear direction) than in the up-down direction. In opening 42, a ratio of the dimension (long-side dimension) in the left-right direction with respect to the dimension (short-side dimension) in the up-down direction is approximately 3 to 6.

Display unit 20 is housed in a lower part of the inside of housing room 41 in such a manner that the display screen of display unit 20 faces upward. Display unit 20 emits light that forms an image. Display unit 20 includes a light source device, and a liquid crystal display (LCD), for example. The LCD is disposed in a light projection direction of the light source device. The light source device is used as a backlight of the LCD. The light source device is a so-called surface light source. The light source device is a sidelight-type light source which uses a solid-state light emitting element such as a light-emitting diode or a laser diode. The light emitted from the light source device passes through the LCD, and then exits from the display screen of display unit 20. The light exited from the display screen of display unit 20 forms an image that is displayed on display unit 20.

Display controller 50 controls the state of displaying the image with display unit 20. Display controller 50 communicates with imaging unit 90 (through wire or wireless communication) via an in-vehicle network in automobile 100, for example. Display controller 50 receives, from imaging unit 90, image data of a captured image of the rearward view of automobile 100. Display controller 50 causes display unit 20 to display an image based on the captured image output from imaging unit 90.

Display controller 50 is formed of a computer system that includes a processor and a memory, both serving as hardware, for example. In other words, display controller 50 is implemented by the computer system that has the processor and the memory, and the computer system functions as display controller 50 to cause the processor to execute a program stored in the memory. The program may be recorded in the memory in advance. Alternatively, the program may be provided via a telecommunication line, or via a computer-readable storage medium such as a memory card, optical disk, or hard disk drive, which has stored the program. The processor of the computer system is formed of one or more electronic circuits including a semiconductor integrated circuit (IC) or a large-scale integrated circuit (LSI). Such a plurality of the electronic circuits may be integrated in a one chip or, alternatively, divided to be disposed in a plurality of chips. Such a plurality of chips may be consolidated together in a single device or, alternatively, disposed separately in a plurality of devices.

Reflecting optical system 30 includes a plurality of mirrors. In the example shown in FIG. 2, reflecting optical system 30 is formed of plane mirror 31 that is disposed facing display unit 20, and concave mirror 32 that reflects light reflected off plane mirror 31, toward opening 42. Plane mirror 31 and concave mirror 32 are produced by depositing, by evaporation, aluminum or the like to form a reflecting metal film on the surface of glass, for example. Each of plane mirror 31 and concave mirror 32 is a mirror such that the reflecting metal film is formed on the surface on which light is incident, for example. Accordingly, these mirrors are less prone to double vision of a reflected image, in comparison with a mirror with a reflecting metal film formed on the surface on the opposite side of glass from a surface on which light is incident.

As described above, reflecting optical system 30 reflects the light a plurality of times, and such light forms the image that is displayed on display unit 20, i.e. the image output from display unit 20. The distance (apparent distance) to the display position of virtual image 300 is determined by the optical path length from display unit 20 to the eyes of user 200. Therefore, reflecting optical system 30 performs such a plural-times reflection of the light output from display unit 20, which allows a reduction in volumetric capacity of housing 40 while maintaining the apparent distance as a desired distance, resulting in downsizing of housing 40.

Opening 42 of housing 40 is covered with beam splitter 43, for example. Beam splitter 43 is an example of a light-transmissive member that is formed with a material capable of transmitting visible light. The terms "capable of transmitting visible light" as used herein means that the transmittance for visible light is 50% or greater, preferably 70% or greater, and more preferably 90% or greater. Since opening 42 of housing 40 is covered with beam splitter 43, dust and the like is less likely to come into housing room 41 from the outside of housing 40, resulting in less adherence of dust and the like on the mirrors of reflecting optical system 30 housed in housing room 41.

Beam splitter 43 has a function of transmitting light incident thereon partially and reflecting it partially. Beam splitter 43 is, for example, a half mirror that has a light transmittance of approximately 50% and a light reflectance of approximately 50%. Outer surface 431 of beam splitter 43 is a plane face. Note that, of both surfaces of beam splitter 43 in the direction in which beam splitter 43 transmits the light through it from the inside of housing 40, outer surface 431 is a surface which is exposed to the outside of housing 40.

Beam splitter 43 is disposed such that outer surface 431 intersects obliquely with the direction parallel to arrow D1 of FIG. 2. The direction parallel to arrow D1 indicates the output direction in which the image reflected off reflecting optical system 30 is output to the outside of housing 40. That is, beam splitter 43 is disposed such that the output direction of the image reflected off reflecting optical system 30 intersects with normal direction D2 to outer surface 431 of beam splitter 43, at a predetermined angle "θ" of smaller than 90 degrees. The output direction of the image reflected off reflecting optical system 30 is the exiting direction of the light that forms the image.

With this configuration, glare from outer surface 431 is reduced when user 200 views outer surface 431 of beam splitter 43 from the output direction of the image. This allows an increase in contrast of the image displayed on display unit 20, when viewed through outer surface 431. In this way, beam splitter 43 is disposed such that outer surface 431 intersects obliquely with the output direction of the image, thereby configuring a glare reducing structure.

As shown in FIG. 2, background object 45 is disposed on the outside of housing 40. Specifically, background object 45 is disposed in a direction in which light come from the outside of housing 40 reversely along the output direction (direction parallel to arrow D1) of the image and incident on outer surface 431 of beam splitter 43 is reflected off outer surface 431 of beam splitter 43. Background object 45 has a flat-plate shape. The dimension in the left-right direction of background object 45 is either equal to or larger than the dimension in the left-right direction of beam splitter 43. Background object 45 has a function of absorbing light incident thereon. The color of background object 45 is darker than that of the inner surface of ceiling part 101 of body 110; for example, the color is black. This reduces the intensity of light incident on beam splitter 43 from a region where background object 45 is disposed, resulting in a decrease in light that is reflected off beam splitter 43. This enhances contrast of the image (virtual image 300) formed by the light transmitted through beam splitter 43, resulting ease of seeing virtual image 300 for user 200.

Moreover, on the outside of housing 40, awning part 44 is disposed so as to surround beam splitter 43 and background object 45. Awning part 44 includes upper plate 44A which protrudes rearward from an upper-side portion of opening 42, and side plates 44B each of which protrudes rearward from a corresponding one of a left-side and a right-side portion of opening 42. Background object 45 is attached on the lower surface of upper plate 44A. In this way, in housing 40, awning part 44 protrudes rearward from all of the upper-side, left-side, and right-side portions of opening 42. Thus, awning part 44 can shield outer surface 431 of beam splitter 43 from external light that is to be incident on outer surface 431. Therefore, the glare from outer surface 431 of beam splitter 43 is further reduced when viewed from the output direction of the image. As a result, the contrast of virtual image 300 formed by the light transmitted through beam splitter 43 is further enhanced.

As described earlier, housing 40 is hung from ceiling part 101 via ball joint 60. Ball joint 60 includes ball stud 61 and socket 62. Ball stud 61 includes a round-bar part and a ball-shaped part. A first end (upper end) of the round-bar part is secured to ceiling part 101. The ball-shaped part is disposed at a second end (lower end) of the round-bar part. Socket 62 is secured at an upper portion of housing 40. Socket 62 is provided with a groove into which the ball-shaped part of ball stud 61 is fitted. In ball joint 60, the ball-shaped part of ball stud 61 is in spherical contact with the groove of socket 62, which allows housing 40 integrated with socket 62 to be moved to any position within a movable range of ball stud 61. Therefore, user 200 can move housing 40 to any position within the movable range of ball joint 60, thereby adjusting the orientation of housing 40 to a desired orientation.

Imaging unit 90 is, for example, a complementary metal oxide semiconductor (CMOS) image sensor, which is mounted in a rear portion of automobile 100, thereby capturing the image of the rearward view of automobile 100. Imaging unit 90 is not limited to the CMOS image sensor and may be a charge coupled device (CCD) image sensor or the like.

Imaging unit 90 outputs, to display controller 50, image data obtained by capturing the rearward view of automobile 100, via an in-vehicle network, for example. Imaging unit 90 is disposed in a center portion in the left-right direction at the rear part of automobile 100, which allows imaging unit 90 to capture the image corresponding to a region that can be visually recognized with a conventional room mirror. Therefore, electronic mirror system 80 can be used as a mirror, such as a conventional room mirror, for checking to see the rearward. Note that imaging unit 90 may capture an image of the rear-side direction of automobile 100. Imaging unit 90 may capture the image of a region that can be visually recognized with a conventional door mirror or a fender mirror, and electronic mirror system 80 may be used as a mirror for checking to see the rearward, being a substitute for a conventional door mirror or a fender mirror. In FIG. 1, imaging unit 90 is mounted at an upper position of body 110, in the rear portion of body 110; however, the mounting position of imaging unit 90 is nothing more than an example. Imaging unit 90 may be disposed at any position from which imaging unit 90 can capture images of a desired region.

(2.2) Operation

Next, operations of electronic mirror system 80 according to the embodiment will be described.

For example, in the state where electronic mirror system 80 is fed with electric power from a battery of automobile 100, electronic mirror system 80 starts operation, upon receiving a control signal to instruct electronic mirror system 80 to start the operation from an electronic control unit (ECU) not shown.

For example, when display controller 50 receives a control signal from the ECU, display controller 50 causes imaging unit 90 to capture an image of the rearward view of automobile 100 at a predetermined frame rate, and then acquires image data of the thus-captured image from imaging unit 90.

Upon receiving the image data of the captured image from imaging unit 90, display controller 50 produces an image based on the captured image, and then causes display unit 20 to display the resultant image.

The image displayed on display unit 20 is reflected off reflecting optical system 30. The image reflected off reflecting optical system 30 is transmitted through beam splitter 43 disposed in opening 42, and output to the outside of housing 40. With this operation, user 200 can visually recognize, through beam splitter 43, the image (reflected image) reflected off reflecting optical system 30. FIG. 4 shows an example of the image displayed on display system 10 of electronic mirror system 80. Through outer surface 431 of beam splitter 43, virtual image 300 based on the captured image of the rearward view of automobile 100 is displayed. The virtual image is formed by the light transmitted through beam splitter 43. Display system 10 outputs the image reflected off reflecting optical system 30, which allows user 200 to visually recognize virtual image 300 as if the virtual image is displayed a few meters ahead of automobile 100, for example. Here, consider a case where user 200 is viewing the frontward direction of automobile 100 through windshield 102. Then, when the user tries to change the viewing to visually recognize virtual image 300, the user has to adjust the focus of the user's eyes onto the virtual image. The required amount of such an adjustment of focusing onto the virtual image is small, compared to cases where display unit 20 is disposed several tens of centimeters ahead of user 200. Therefore, the time required for user 200 to adjust the focus of the user's eye onto virtual image 300 can be made short. Moreover, this brings about ease of focus adjustment even if the user has some difficulty in focusing the user's eye onto a relatively short-distance subject due to an advanced age, farsightedness, etc.

Next, descriptions will be made regarding how user 200 can see virtual image 300, with reference to FIGS. 5A, 5B, and 6.

As described earlier, reflecting optical system 30 of display system 10 is formed of plane mirror 31 and concave mirror 32. As shown in FIGS. 5A and 5B, plane mirror 31 reflects a part of the image displayed on display unit 20. Accordingly, virtual image 300 that is formed by light reflected off reflecting optical system 30 corresponds to a part of virtual image 310 that is formed by light reflected off reflecting optical system 30 in the case where reflecting optical system 30 reflects the entire image that is displayed on display unit 20.

Figure 5A:
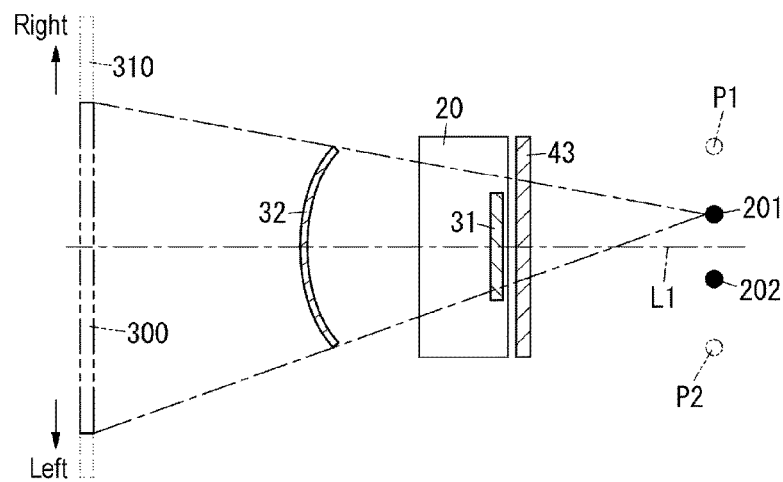
FIGS. 5A and 5B are views illustrating a region of a virtual image that is in sight of a right eye of a user, in the display system shown in FIG. 2.
Figure 6:
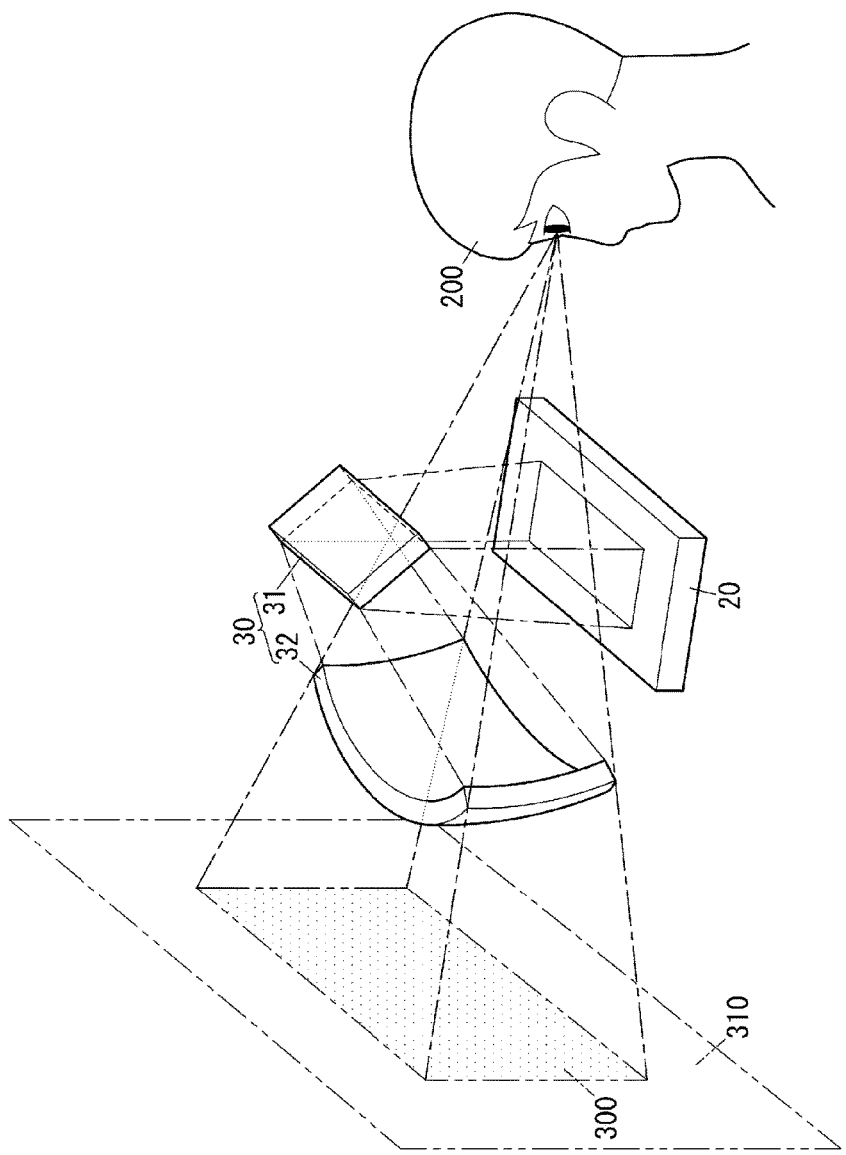
FIG. 6 is a view illustrating the region of the virtual image that is in sight of an eye of the user, in the display system shown in FIG. 2.

In the state in which user 200, being a driver, is being seated in place, as shown in FIGS. 5A and 6, actually-seeable virtual image 300 is positioned at a position corresponding to a center portion of virtual image 310 of the entire iamge, in both the up-down direction and the left-right direction. FIG. 5A shows a region of virtual image 300 which can be seen by right eye 201 of user 200. The region corresponds to a part of virtual image 310 that is formed when the entire image displayed on display unit 20 is reflected off reflecting optical system 30. Straight line L1 is in parallel with the front-rear direction and passes through the midpoint between right eye 201 and left eye 202. A visual field of right eye 201 and a visual field of left eye 202 are in line symmetry with respect to straight line L1. Therefore, the region of a virtual image seeable from left eye 202 is in line symmetry with the region of virtual image 300 seeable from right eye 201 with respect to straight line L1.

Figure 5B:
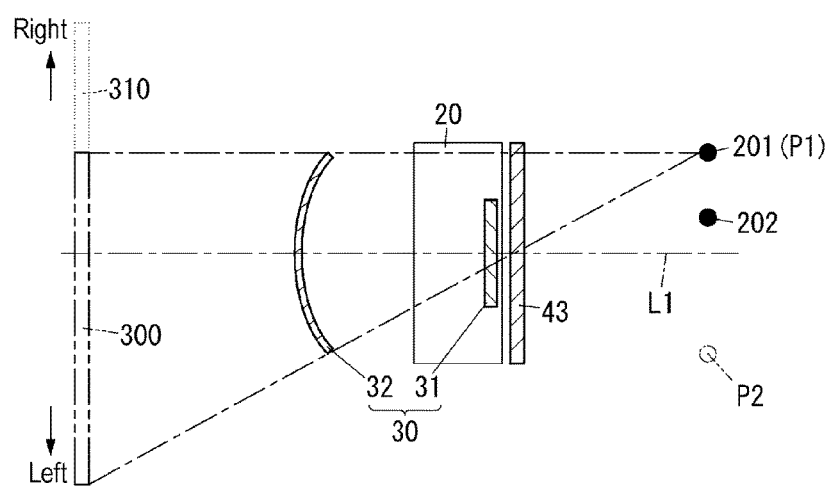

On the other hand, as shown in FIG. 5B, when the head of user 200 moves toward the right side (the upper side in FIG. 5B) relative to the head position indicated in FIG. 5A, the regions of virtual images 300 seeable from the left and right eyes of user 200 move toward the left side (the lower side in FIG. 5B). FIG. 5B shows a region of virtual image 300 seeable from right eye 201 of user 200 when right eye 201 of user 200 is positioned at position P1. In this case, the left end of virtual image 300 seeable from right eye 201 of user 200 agrees with the left end of virtual image 310.

On the contrary, when the head of user 200 moves toward the left side, the regions of the virtual images seeable from the left and right eyes move toward the right side (the upper side in FIG. 5B), following the movement of the head. When left eye 202 moves to position P2 (the position in symmetry with position P1 with respect to straight line L1), the right end of virtual image 300 seeable from left eye 202 of user 200 agrees with the right end of virtual image 310 that is formed by the entire image displayed on display unit 20.

Here, assume that the head of user 200 moves in the left-right direction, between a first position at which right eye 201 is present at position P1 and a second position at which left eye 202 is present at position P2. In this case, following the movement of the head of user 200, the region of the virtual image seeable from each of right eye 201 and left eye 202 varies.

In a case where display unit 20 is disposed on the surface of housing 40, i.e. at the position of beam splitter 43, the image displayed on display unit 20 remains unchanged even when the position of the head of user 200 moves. On the other hand, in the embodiment, when the position of the head of user 200 moves within a range between the first and second positions, the region of virtual image 300 seeable from each of right eye 201 and left eye 202 varies. With this operation, user 200 can use display system 10 as if it is a mirror. Moreover, as long as the position of the head of user 200 moves within the range between the first and second positions, the frame of display unit 20 is not seen from the left and right eyes of user 200, resulting in no feeling of something uncomfortable for user 200. Here, the eyebox as used herein is defined as the rectangular range of the eye point of user 200; as long as the eyes of user 200 are within the rectangular range, user 200 does not see the frame of display unit 20 even when user 200 moves the eye point position in the up-down and left-right directions. In other words, as long as the left and right eyes of user 200 are present within a predetermined eyebox, the frame of display unit 20 is not seen from the left and right eyes of user 200, resulting in no feeling of something uncomfortable for user 200.

In a case where the head of user 200 moves in the up-down direction, the region of virtual image 300 varies, in the up-down direction, which is seeable from each of the right and left eyes following the movement of the head, as in the case of the movement in the left-right direction. That is, an upward movement of the head of user 200 causes a downward movement of the region of virtual image 300 seeable from each of the right and left eyes, while a downward movement of the head of user 200 causes an upward movement of the region of virtual image 300 seeable from each of the right and left eyes.

Moreover, in display system 10, the resolution of display unit 20 is set to a value higher than a limit resolution of virtual image 300 at the display position. The limit resolution is a limiting value of resolution perceivable for a human eye and can be determined based on gaps of Landolt rings, for example, which are used in eyesight tests. The longer the apparent distance is, the lower the limit resolution is; the better the eyesight is, the higher the limit resolution is.

Accordingly, once both the display position (i.e. the apparent distance to virtual image 300) of virtual image 300 and the eyesight of expected user 200 are determined, the limit resolution of virtual image 300 at the display position can be determined using a predetermined calculation formula. Reflecting optical system 30 magnifies the image displayed on display unit 20 and displays the magnified image. Therefore, once the limit resolution of virtual image 300 at the display position is determined, the resolution of display unit 20 can be determined in accordance with the limit resolution. Then, the resolution of display unit 20 is set to a value higher than the limit resolution of virtual image 300 at the display position. With this setting, virtual image 300 is displayed at a predetermined display position, in higher resolutions than the limit resolution. As a result, user 200 who is seeing virtual image 300 can feel a depth and stereognostic sense of virtual image 300 as if the user is seeing into a real mirror. In particular, during traveling of automobile 100, a high-definition image moves following the traveling of automobile 100, which allows user 200 to more really feel the stereognostic sense.

(3) Modified Examples

The embodiment described above is nothing more than an example of various embodiments of the present disclosure. The embodiment described above may be modified in accordance with designing and the like as long as the modifications can achieve an object of the present disclosure.

Hereinafter, modified examples of the embodiment will be described. The modified examples to be described below may be appropriately combined together to produce another applicable example. Note that any of the display systems according to the modified examples to be described below may be mounted to automobile 100, in place of display system 10 shown in FIG. 1. Moreover, any of the display systems according to the modified examples to be described below may include display controller 50 and, together with imaging unit 90 shown in FIG. 1, configure electronic mirror system 80.

(3.1) First Modified Example

Figure 7:
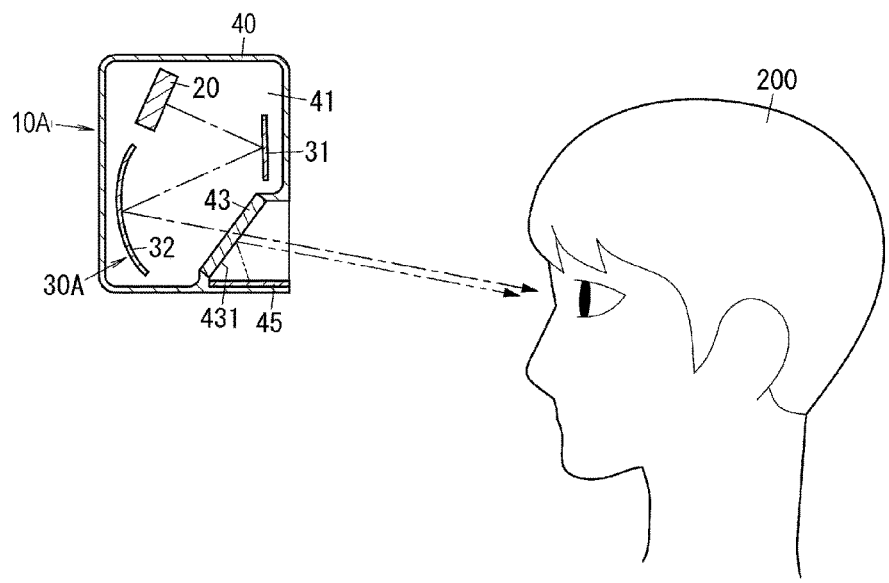
FIG. 7 is a schematic cross-sectional view showing a configuration of a display system according to a first modified example of the first embodiment of the present disclosure.

In display system 10, the image displayed on display unit 20 is reflected off, totally two times, plane mirror 31 and concave mirror 32 of reflecting optical system 30. Then the thus-reflected image is output through beam splitter 43 disposed in opening 42 to the outside of housing 40. However, the configuration of the reflecting optical system is not limited to this. FIG. 7 is a schematic cross-sectional view showing a configuration of display system 10A according to a first modified example.

In display system 10, as shown in FIG. 2, display unit 20 is disposed in a lower part of the inside of housing room 41. On the other hand, in display system 10A, display unit 20 is disposed in an upper part of the inside of housing room 41. In display system 10A, display unit 20 and reflecting optical system 30A are housed in the inside of housing 40. Reflecting optical system 30A is formed of plane mirror 31 and concave mirror 32. In display system 10A, as in the case of display system 10, the image displayed on display unit 20 is reflected off plane mirror 31 and concave mirror 32. Then the image reflected off concave mirror 32 is transmitted through beam splitter 43 and output to the outside of housing 40. That is, user 200 can see the image (virtual image 300), through beam splitter 43, originally displayed on display unit 20 and then reflected off reflecting optical system 30A.

Moreover, in display system 10A, in order to reduce glare from outer surface 431 of beam splitter 43, the output direction of the image reflected off reflecting optical system 30A intersects obliquely with the normal direction to beam splitter 43. Beam splitter 43 is inclined such that the upper part thereof is at a more rearward position of automobile 100 than the lower part thereof is. Thus, the upper part is closer to user 200 than the lower part is.

Moreover, in housing 40, background object 45 is disposed in the direction in which light come from the outside of housing 40 reversely along the output direction in which the image is output after reflected off reflecting optical system 30A and being incident on beam splitter 43 is reflected off beam splitter 43. Background object 45 has a function of absorbing light incident thereon. The color of background object 45 is darker than those of the interior materials (a floor material, seat, etc.) of automobile 100; for example, the color is black. This reduces the intensity of the light incident on beam splitter 43 from a region where background object 45 is disposed, resulting in a decrease in light that is reflected off beam splitter 43. Thus, contrast of the image (virtual image 300) formed by light transmitted through beam splitter 43 is enhanced, resulting in ease of seeing virtual image 300 of the image displayed on display unit 20 for user 200.

(3.2) Second Modified Example

In display systems 10 and 10A, the number of reflection times of the light with each of reflecting optical systems 30 and 30A is 2. However, the number of reflection times of light with the reflecting optical system may be 1 or, alternatively, 3 or more.

Figure 8:
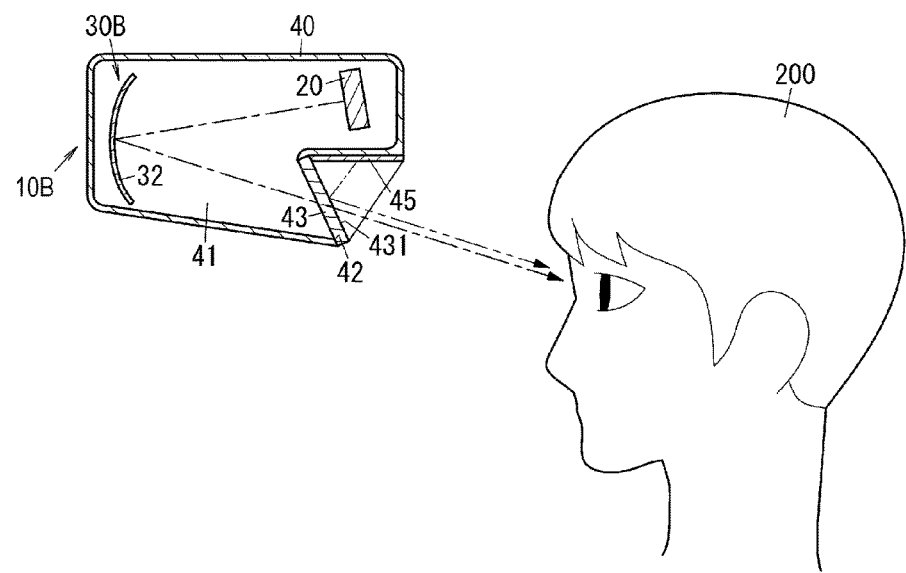
FIG. 8 is a schematic cross-sectional view showing a configuration of a display system according to a second modified example of the first embodiment of the present disclosure, in a case where the number of reflection times in a reflecting optical system is one.

FIG. 8 shows a configuration of display system 10B that includes reflecting optical system 30B with which the number of reflection times of light is 1.

Reflecting optical system 30B is formed of concave mirror 32 that reflects the image displayed on display unit 20. In the inside of housing 40, display unit 20 and concave mirror 32 are housed. Concave mirror 32 reflects the image displayed on display unit 20, and then outputs the reflected image through beam splitter 43 to the outside of housing 40. That is, user 200 can see the image (virtual image 300) displayed on display unit 20 and then reflected off reflecting optical system 30B, through beam splitter 43.

Figure 9A:
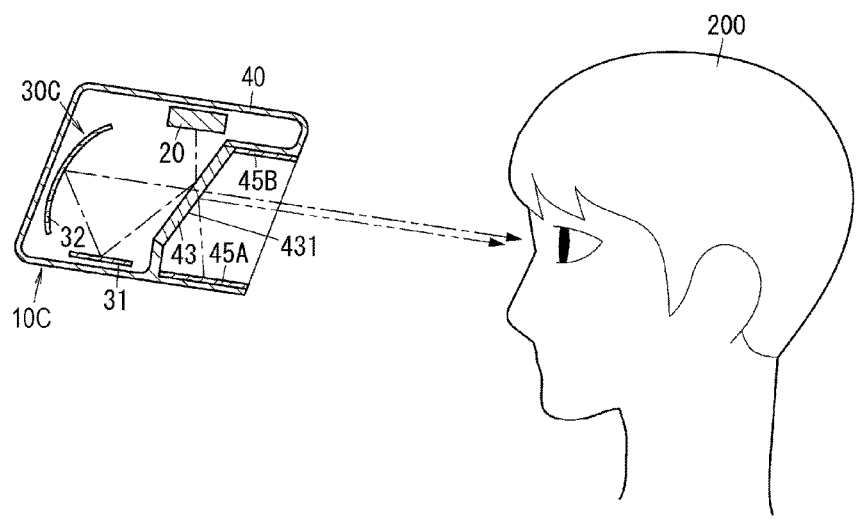
FIGS. 9A and 9B are schematic cross-sectional views each showing a configuration of a display system according to the second modified example of the first embodiment of the disclosure, in a case where the number of reflection times in a reflecting optical system is three.
Figure 9B:
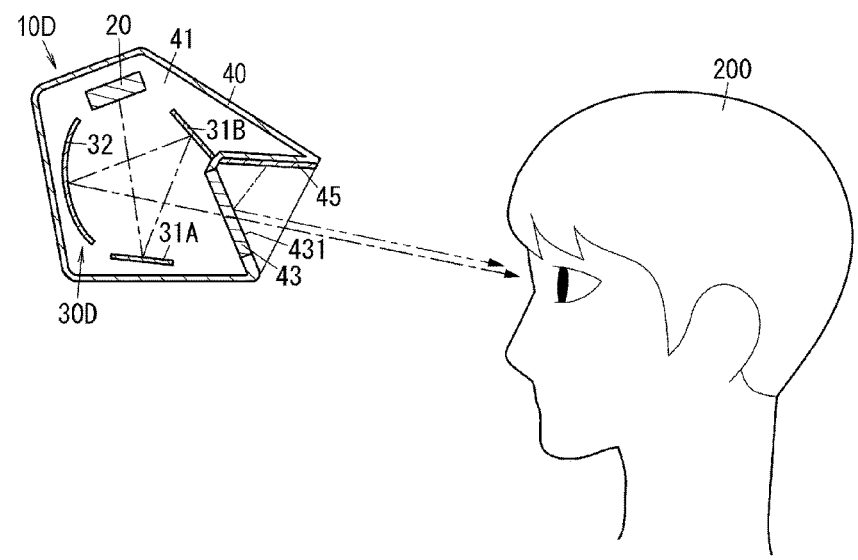

Moreover, FIGS. 9A and 9B show display systems 10C and 10D that include reflecting optical systems 30C and 30D, respectively, with each of which the number of reflection times of light is 3.

In display system 10C, reflecting optical system 30C is formed of beam splitter 43, plane mirror 31, and concave mirror 32. In display system 10C, display unit 20 is disposed at an upper part of the inside of housing 40. Beam splitter 43 is disposed at a position on which light output from display unit 20 is incident. The light output from display unit 20 is reflected off beam splitter 43, plane mirror 31, and concave mirror 32, and then output through beam splitter 43 to the outside of housing 40. Accordingly, user 200 can see an image (virtual image 300) displayed on display unit 20 and then reflected off reflecting optical system 30C, through beam splitter 43.

Background object 45A is disposed below beam splitter 43, and background object 45B is disposed above beam splitter 43. Background objects 45A and 45B have a function of absorbing light. The colors of background objects 45A and 45B are darker than those of the interior materials (seats, a floor material, ceiling part 101, etc.) of the automobile; for example, the colors are black. This reduces the intensity of light incident on beam splitter 43 from regions where background objects 45A and 45B are disposed, resulting in a decrease in the light that is reflected off beam splitter 43. Thus, contrast of the image displayed on display unit 20 and transmitted through beam splitter 43 is enhanced.

In display system 10C, beam splitter 43 being a light-transmissive member also serves as one of a plurality of the mirrors included in reflecting optical system 30C, resulting in a reduction in the component count. However, beam splitter 43 is not always required to also serve as one of the plurality of the mirrors included in the reflecting optical system.

In display system 10D shown in FIG. 9B, reflecting optical system 30D is formed of plane mirrors 31A and 31B, and concave mirror 32. In display system 10D, display unit 20 is disposed at an upper part of the inside of housing room 41. Plane mirror 31A is disposed at a lower part of the inside of housing room 41. Plane mirror 31B is disposed at a rear part of the inside of housing room 41. Concave mirror 32 is disposed at a front part of the inside of housing room 41. Light is output from display unit 20, reflected off plane mirror 31A, plane mirror 31B, and concave mirror 32, and then output through beam splitter 43 to the outside of housing 40. Accordingly, user 200 can see an image (virtual image 300) displayed on display unit 20 and then reflected off optical system 30D, through beam splitter 43.

Each of reflecting optical systems 30, and 30A to 30D of display systems 10, and 10A to 10D, respectively, is nothing more than an example. The configuration of each of the reflecting optical systems may be appropriately modified in accordance with the size of the display screen of display unit 20, the apparent distance to virtual image 300, the size of virtual image 300, and the like.

Each of reflecting optical systems 30, 30A, 30C, and 30D reflects the light plural times, so that it includes a plurality of the mirrors. The mirrors of each of the reflecting optical systems are plane mirrors, except for only the last mirror, i.e. concave mirror 32, which lastly reflects the light. However, any one of the mirrors other than concave mirror 32 is not always required to be a plane mirror; it may be either a convex or concave mirror. Moreover, each of reflecting optical systems 30, and 30A to 30D includes one or more mirrors, and the one mirror or any of mirrors may be any one of a concave, convex, and plane mirror. The mirror may be appropriately changed in accordance with a desired image that is output to the outside of housing 40.

Moreover, reflecting optical systems 30, and 30A to 30D, each of which includes one or more mirrors to reflect light, preferably include an aberration correcting part to reduce (correct) aberrations. For example, in each of reflecting optical systems 30, and 30A to 30D, at least any one of the reflection surfaces of the mirrors may be a free-form surface. Such a reflection surface configured with the free-form surface can serve as an aberration correcting part. The free-form surface is a curved surface that is defined as follows: That is, a plurality of intersection points and a plurality of curvatures are set in a space, followed by interpolating surfaces among the plural intersection points using an equation of higher degree. Making the reflection surface of the mirror included in each of reflecting optical systems 30, and 30A to 30D to be a free-form surface allows implementation of an optical design for a reduced aberration. Note that the aberration correcting part is not limited to the configuration in which the reflection surface is a free-form surface. Instead, another method may be adopted which can correct aberrations. For example, the image displayed on display unit 20 may be corrected to reduce aberrations.

Moreover, each of reflecting optical systems 30, and 30A to 30D includes no lens; therefore, these systems are less likely to being subjected to the influence of a chromatic aberration. However, each of reflecting optical systems 30, and 30A to 30D may include a lens (either a convex or a concave lens) that is disposed in the optical path.

(3.3) Third Modified Example

In each of display systems 10, and 10A to 10D, a changeover switch may be provided so that the changeover switch switches an orientation of beam splitter 43 between a first orientation and a second orientation. When beam splitter 43 is in the first orientation, outer surface 431 of beam splitter 43 obliquely intersects with an output direction in which the image reflected off a corresponding one of reflecting optical systems 30, and 30A to 30D, and the output direction intersects with a normal to the outer surface at a first angle. When beam splitter 43 is in the second orientation, the output direction intersects with the normal to outer surface 431 of beam splitter 43 at a second angle smaller than the first angle.

Figure 10:
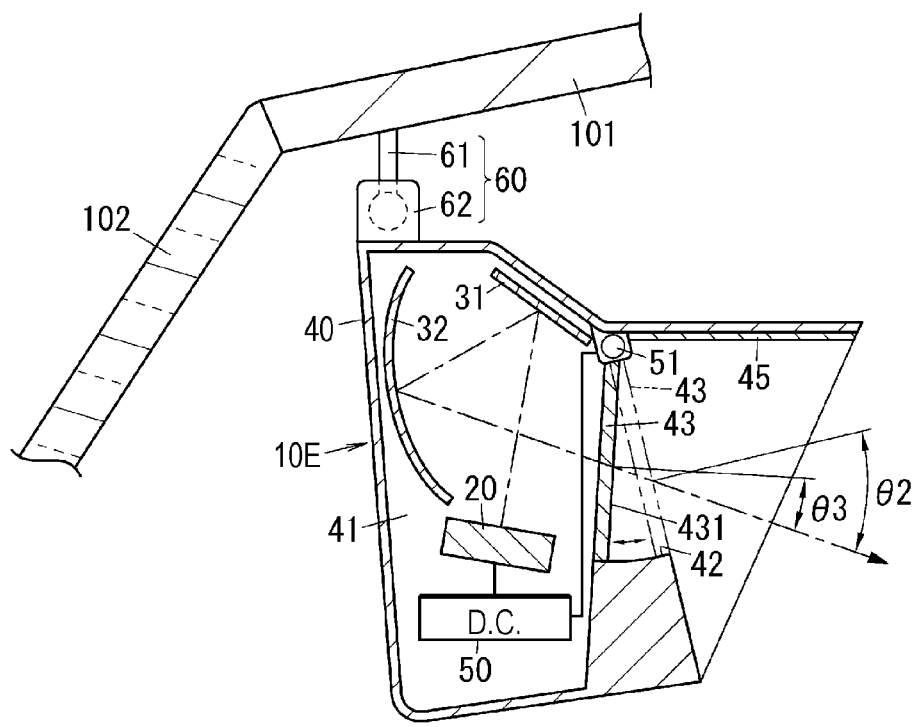
FIG. 10 is a schematic cross-sectional view showing a configuration of a display system according to a third modified example of the first embodiment of the present disclosure.

FIG. 10 is a schematic cross-sectional view showing a configuration of display system 10E according to a third modified example of the embodiment. Display system 10E is identical to display system 10 shown in FIG. 2 except that it further includes motor 51 serving as a changeover switch that changes the orientation of beam splitter 43 between the first orientation and the second orientation. According to this example, angle θ3, in the second orientation, between the output direction of the image and the normal to outer surface 431 of beam splitter 43 is smaller than corresponding angle θ2 in the first orientation.

Beam splitter 43 is held by housing 40, pivotably about a pivot disposed at an upper end part of beam splitter 43. The pivot in the upper end part of beam splitter 43 is coupled with a rotary shaft of motor 51. The direction and amount of turn of motor 51 is controlled by display controller 50. In a case of displaying an image on display unit 20, display controller 50 causes motor 51 to turn to change the orientation of beam splitter 43 to be in the first orientation, followed by holding beam splitter 43 in the first orientation. In a case of not dislpaying an image on display unit 20, display controller 50 causes motor 51 to turn, in the reverse direction, to change the orientation of beam splitter 43 to be in the second orientation, followed by holding beam splitter 43 in the second orientation.

In the first orientation, angle θ2 between the output direction of the image and the normal to outer surface 431 of beam splitter 43 is larger than angle θ3 in the second orientation. For this reason, when user 200 sees beam splitter 43 from the output direction of the image, the glare from outer surface 431 of beam splitter 43 is reduced.

In this way, in the case of displaying the image on display unit 20, display controller 50 causes beam splitter 43 to be held in the first orientation, which allows a reduction in glare from outer surface 431 of beam splitter 43. Therefore, contrast of the image displayed on display unit 20 is enhanced.

On the other hand, in the case of not displaying the image on display unit 20, display controller 50 causes beam splitter 43 to be held in the second orientation, which allows beam splitter 43 to be used as a mirror for checking to see the rearward. Note that the changeover switch is not limited to motor 51 and may be configured with an actuator or the like. Moreover, the changeover switch may be configured to be manually operable.

(3.4) Fourth Modified Example

In each of display systems 10, and 10A to 10E, a position adjuster may be provided for adjusting the position of display unit 20, in the exiting direction in which light exits from display unit 20.

Figure 11A:
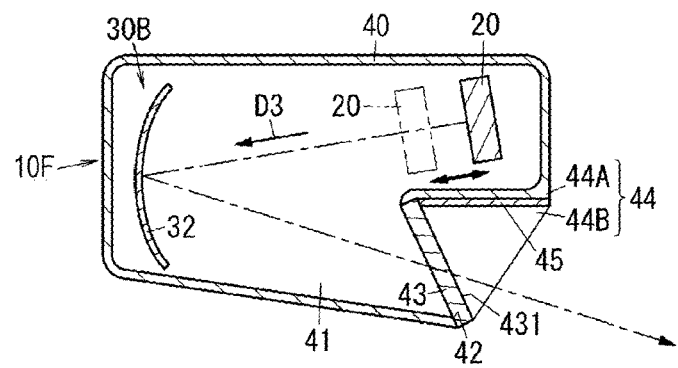
FIG. 11A is a schematic cross-sectional view of a display system, when viewed from the left side, according to a fourth modified example of the first embodiment of the present disclosure.
Figure 11B:
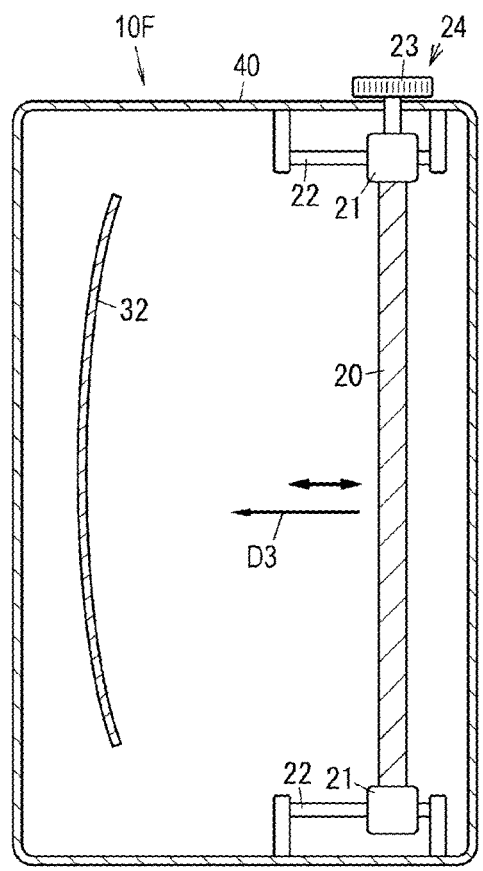
FIG. 11B is a schematic cross-sectional view of the display system shown in FIG. 11A, when viewed from the upper side.

FIG. 11A is a cross-sectional view of display system 10F, when viewed from the left side, according to a fourth modified example of the embodiment. FIG. 11B is a cross-sectional view of display system 10F, when viewed from the upper side. Display system 10F includes position adjuster 24 configured to adjust the position of display unit 20, in output direction D3 in which the image is output from display unit 20. Output direction D3 equals the exiting direction in which the light forming the image exits.

Position adjuster 24 includes: a pair of holders 21 holding both ends of display unit 20; a pair of shafts 22 disposed at both left and right sides of display unit 20, along a direction parallel to output direction D3; and adjusting knob 23.

Each of holders 21 is attached to a corresponding one of shafts 22, movably in the axial direction of shaft 22. A shaft of adjusting knob 23 is attached to one of holders 21. One of shafts 22 is provided with teeth, along the axial direction, which mesh with a gear that is disposed on the shaft of adjusting knob 23.

With this configuration, rotation of adjusting knob 23 rotates the gear disposed on the shaft of adjusting knob 23. This causes holder 21 to travel along the axial direction of shaft 22, which in turn causes display unit 20 to travel either forward or rearward along output direction D3 in accordance with the travel of holder 21.

By using position adjuster 24, the position of display unit 20 can be adjusted along output direction D3, which allows the apparent distance to virtual image 300 to be adjusted. Therefore, user 200 can use adjusting knob 23 to adjust the apparent distance to virtual image 300, thereby causing virtual image 300 to be displayed at a desired display position.

Note that, for example, a motor may be further provided to rotate adjusting knob 23, which allows display controller 50 to drive the motor, thereby automatically adjusting the position of display unit 20. For example, in a case where automobile 100 can be used by anyone among a plurality of users 200, display controller 50 stores, in a memory, biological information on the plurality of users 200 of automobile 100. The stored biological data of each individual user is associated with the position of display unit 20. The position is particularly favored by the individual user. The biological information can be distinguished via image recognition or voice recognition, for example. Upon identifying individual user 200 based on the biological information, display controller 50 cause adjusting knob 23 to rotate with the motor based on the identification result. This causes display unit 20 to travel to the position that is associated with the thus-identified user 200. Note that the way to identify user 200 is not limited to the method in which user 200 is identified based on the result of detecting the biological information of user 200. For example, an input device may be provided so as to receive an operation for inputting identification information by user 200. User 200 currently using automobile 100 may be identified through the reception of input of the identification information via the input device. Alternatively, a reading device may be used to read the identification information from a medium in which the identification information of user 200 is stored, and user 200 currently using automobile 100 is identified based on the thus-read identification information. Examples of this type of the medium include a memory card and a radio-frequency (RF) tag.

(3.5) Fifth Modified Example

Figure 12:
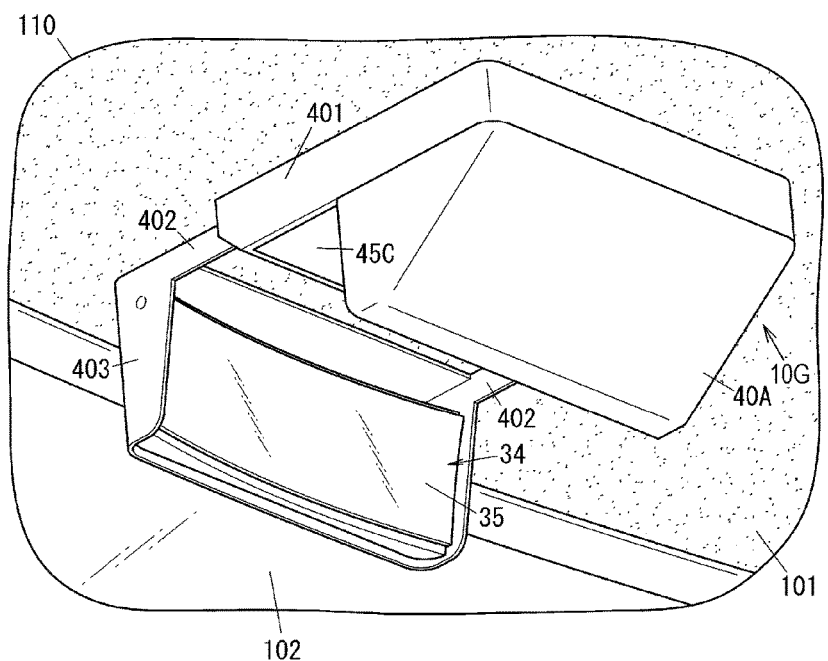
FIG. 12 is an external schematic view of a display system according to a fifth modified example of the first embodiment of the present disclosure.
Figure 13:
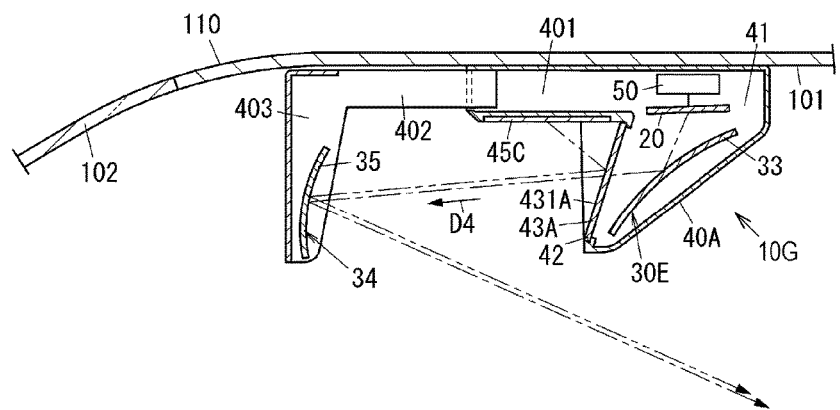
FIG. 13 is a schematic cross-sectional view of a configuration of the display system shown in FIG. 12.
Figure 14:
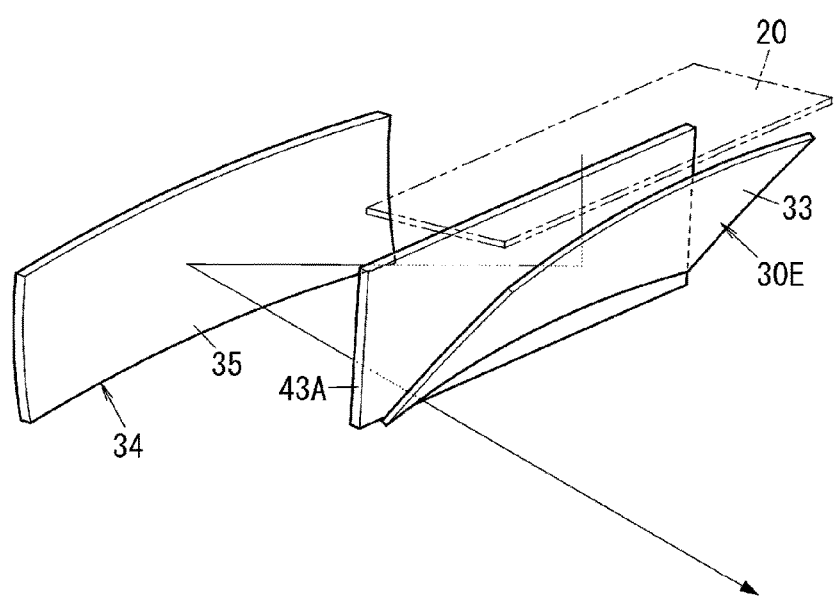
FIG. 14 is a schematic view illustrating a reflecting optical system and external reflecting optical system of the display system shown in FIG. 12.

Display system 10G according to a fifth modified example will be described with reference to FIGS. 12 to 14. FIG. 12 is an external schematic view of display system 10G according to the fifth modified example of the embodiment. FIG. 13 is a schematic cross-sectional view showing a configuration of display system 10G. FIG. 14 is a schematic view illustrating reflecting optical system 30E and external reflecting optical system 34 of display system 10G. Display system 10G is different from display system 10 in that display system 10G further includes external reflecting optical system 34 apart from reflecting optical system 30E that is housed in housing room 41 of housing 40A.

As shown in FIGS. 12 and 13, housing 40A is mounted on ceiling part 101 of body 110, in the state in which a surface provided with opening 42 faces the frontward direction (the direction in which windshield 102 is disposed) of automobile 100. That is, the top panel of housing 40A is a mounting part with which housing 40A is mounted on ceiling part 101, i.e. a part of automobile 100.

In housing room 41 of housing 40A, display unit 20, display controller 50, and reflecting optical system 30E are housed. Housing 40A is provided with opening 42. In opening 42, transmissive cover 43A is attached which serves as a light-transmissive member that is formed of a material permeable to visible light. Transmissive cover 43A is formed of glass, for example. Transmissive cover 43A has outer surface 431A that is a flat face. Note that transmissive cover 43A may be formed of a synthetic resin, other than glass, which is permeable to visible light. Examples of the synthetic resin include a polycarbonate resin and an acryl resin. The visible light transmittance of transmissive cover 43A is 90% or greater, for example.

Display unit 20 is disposed at an upper part of housing room 41, in the inside of housing room 41.

Reflecting optical system 30E includes convex mirror 33, for example. Reflecting optical system 30E reflects an image displayed on display unit 20. Then, the image reflected off reflecting optical system 30E is output through transmissive cover 43A to the outside of housing 40A. In reflecting optical system 30E, as convex mirror 33 reflects the image displayed on display unit 20, distortion of virtual image 300 that is visually recognized by user 200 can be suppressed. The surface of convex mirror 33 is a free-form surface, for example; however, it may be a curved surface such as a paraboloid of revolution. The surface of convex mirror 33 may be appropriately changed to provide desired reflected images.

Note that reflecting optical system 30E is not limited to the configuration that includes convex mirror 33. Reflecting optical system 30E may include a plane mirror or a concave mirror, instead of convex mirror 33. In the case shown in FIG. 13, reflecting optical system 30E causes the image displayed on display unit 20 to be reflected off convex mirror 33 one time, followed by outputting the thus-reflected image through opening 42 to the outside of housing 40A. However, reflecting optical system 30E is not limited to the configuration in which the number of reflection times of the image displayed on display unit 20 is 1. Reflecting optical system 30E may have another configuration in which the image displayed on display unit 20 is reflected a plurality of times, and then output through opening 42 to the outside of housing 40A.

In an upper part of housing 40A, projection part 401 is disposed which protrudes ahead of the part (surface) in which opening 42 is disposed. On a lower outer surface of projection part 401, background object 45C is attached. Background object 45C is disposed in a direction in which light come from the outside of housing 40A reversely along a direction parallel to arrow D4 and being incident on outer surface 431A of transmissive cover 43A is reflected off outer surface 431A of transmissive cover 43A. The direction parallel to arrow D4 is the output direction in which the image is output through opening 42 to the outside of housing 40A.

Background object 45C has a flat-plate shape. Background object 45C is either equal to or larger than transmissive cover 43A in dimension in the left-right direction. The left-right direction is the direction in which a pair of arms 402 face each other which are to be described later with reference to FIG. 12. Background object 45C has a function of absorbing light incident thereon. The color of background object 45C is darker than that of the inner surface of ceiling part 101 of body 110; for example, the color is black. This reduces the intensity of light incident on transmissive cover 43A from a region where background object 45C is disposed, resulting in a decrease in light that is reflected off transmissive cover 43A. Thus, contrast of the image (virtual image) formed by the light transmitted through transmissive cover 43A is enhanced, resulting in ease of seeing virtual image 300 of the image displayed on display unit 20, for the user such as a driver.

To projection part 401 of housing 40A, rear end parts of the pair of arms 402 are coupled. To front end parts of the pair of arms 402, frame 403 is coupled so as to support external reflecting optical system 34.

External reflecting optical system 34 includes concave mirror 35 having a free-form surface, for example. Concave mirror 35 is supported by frame 403 so as to face transmissive cover 43A that is attached to opening 42 of housing 40A. Accordingly, as shown in FIGS. 13 and 14, the image displayed on display unit 20 is reflected off convex mirror 33 of reflecting optical system 30E. Then, the image reflected off convex mirror 33 is output to the outside of housing 40A through transmissive cover 43A in opening 42. Then, the image output to the outside of housing 40A through opening 42 is reflected off concave mirror 35 of external reflecting optical system 34. In this way, the image reflected off concave mirror 35 is visually recognized by the user such as a driver.

Note that frame 403 may be pivotably coupled to arms 402. This makes it possible to adjust the angle of frame 403 with respect to arms 402 such that the image reflected off external reflecting optical system 34 comes into sight of the user. Alternatively, concave mirror 35 of external reflecting optical system 34 may be pivotably coupled to frame 403. Yet alternatively, display system 10G may be pivotably attached to ceiling part 101 by hanging it from ceiling part 101 via a ball joint.

Moreover, the reflecting surface of external reflecting optical system 34 may be formed on the back surface side (convex surface side), allowing protection of the reflecting surface.

As described above, in display system 10G, external reflecting optical system 34 disposed on the outside of housing 40A reflects the image output to the outside of housing 40A through opening 42. This allows a reduction in size of reflecting optical system 30E that is housed in housing room 41, while maintaining the distance from display unit 20 to user 200 at a desired distance in accordance with an apparent distance. This, in turn, allows downsizing of housing 40A. The downsizing of housing 40A allows, for example, a part or the whole of housing 40A to be embedded in ceiling part 101 of body 110, resulting in an expansion of an upper space of the interior of the vehicle.

Note that each of display systems 10A to 1OF may further include external reflecting optical system 34. This allows the downsizing of housing 40, as in the case described above.

(3.6) Other Modified Examples

In each of display systems 10 and 10A to 10G, display unit 20 is a liquid crystal display device including a liquid crystal display and a light source device. Other than this, display unit 20 may be a self-luminous display panel which includes an organic light emitting diode (OLED) or the like. Moreover, display unit 20 may have a configuration in which a diffuse transmissive screen is scanned with laser light from behind of the screen to depict an image on the screen. Furthermore, display unit 20 may have a configuration in which a projector is used to project an image onto a diffuse transmissive screen from behind of the screen.

In each of display systems 10 and 10A to 10F, opening 42 of a corresponding one of housing 40 and housing 40A is covered with beam splitter 43 capable of transmitting visible light. However, the light-transmissive member that covers opening 42 is not limited to beam splitter 43. The light-transmissive member that covers opening 42 may be a transparent glass plate or, alternatively, a transparent plate such as transmissive cover 43A described in the fifth modified example. Such a transparent plate is formed of a synthetic resin capable of transmitting visible light.

In each of display systems 10 and 10A to 10F, beam splitter 43 being a light-transmissive member is disposed such that outer surface 431 intersects obliquely with the output direction of the image. This configuration reduces glare from outer surface 431 of beam splitter 43, when beam splitter 43 is seen from the output direction of the image. Likewise, in display systems 10G, transmissive cover 43A being a light-transmissive member is disposed such that outer surface 431A intersects obliquely with the output direction of the image. This configuration reduces glare from outer surface 431A of transmissive cover 43A, when transmissive cover 43A is seen from the output direction of the image via external reflecting optical system 34.

That is, the glare reducing structure for reducing the glare from the outer surface of the light-transmissive member is configured by a structure in which the light-transmissive member is disposed obliquely with respect to the output of the image. However, the glare reducing structure is not limited to this. For example, outer surface 431 of beam splitter 43 and outer surface 431A of transmissive cover 43A may be subjected to surface treatment with a chemical solution or the like, thereby forming a fine bumpy structure on these surfaces. With this configuration, light is irregularly reflected off each of outer surface 431 and outer surface 431A, resulting in a reduction in the glare from each of outer surface 431 and outer surface 431A. Moreover, outer surface 431 and outer surface 431A may be subjected to a surface roughening process, thereby reducing the glare from each of these surfaces. Alternatively, an anti-reflection film capable of reducing glare may be laminated on each of outer surface 431 and outer surface 431A. Moreover, a so-called moth-eye structure may be formed on outer surface 431 and outer surface 431A, thereby reducing the glare from each of outer surface 431 and outer surface 431A.

In each of display systems 10, 10A, 10B, and 10D to 10F, background object 45 has a function of absorbing light; however, background object 45 may have a function of scattering light or, alternatively, both functions of absorbing and scattering light. This may be achieved by providing background object 45 with a function of scattering light as follows: That is, the surface of background object 45 is formed in a fine bumpy structure or, alternatively, the surface of background object 45 is subjected to a surface roughening process. Light incident on background object 45 is scattered by the surface of background object 45, thereby reducing the light that enters beam splitter 43. This results in a decrease in the light that is reflected off beam splitter 43 to enter the eyes of user 200, leading to a reduced glare from outer surface 431 of beam splitter 43. Note that, like background object 45, this is also true for background objects 45A and 45B of display system 10C and background object 45C of display system 10G.

As described above, each of background objects 45, 45A to 45C is disposed in the direction. In the direction, light is reflected off the outer surface. The light comes from the outside of housing 40 reversely along the output direction in which the image is output after reflected off a corresponding one of reflecting optical systems 30, 30A to 30E, and is incident on the outer surface of the light-transmissive member. Each of background objects 45, 45A to 45C performs a function of at least one of absorbing light and scattering light, thereby further reducing the glare from the outer surface of the light-transmissive member caused by the light incident on the light-transmissive member from the outside of housing 40.

Each of display systems 10, 10A to 10G is not limited to the configuration to display the captured image of the rearward of automobile 100. For example, each of display systems 10, 10A to 10G may display an image based on the captured image of the rearward sideview, sideward view, or forward view of automobile 100.

Electronic mirror systems 80 each of which includes a corresponding one of display systems 10, 10A to 10G are applicable not only to automobiles 100, but also to movable-body apparatuses other than automobiles 100, which include two-wheeled vehicles, electric trains, aircraft, construction equipment, and vessels, for example.

Moreover, each of display systems 10, 10A to 10G may be configured with not only one device but also a plurality of devices. That is, the functions of each of display systems 10, 10A to 10G may be decentralized and provided in not smaller than two devices. Display controller 50 may be disposed in an ECU of automobile 100 or a server apparatus on the outside of automobile 100. In this case, the ECU or server apparatus is used to produce images to be displayed on display unit 20.

(4) Summary

As described above, the display system according to a first aspect of the present disclosure includes a display unit, a housing, and a reflecting optical system. The display unit displays an image based on a captured image. The housing includes a housing room that houses the display unit. The reflecting optical system is housed in the housing room. The reflecting optical system reflects the image displayed on the display unit, thereby outputting the thus-reflected image through an opening of the housing to the outside of the housing. In this configuration, the display unit and the reflecting optical system are housed in the one housing. Therefore, the system can be made compact as a whole, compared to the case in which the display unit and the reflecting optical system are housed separately in different housings.

Moreover, the opening may be covered with a light-transmissive member permeable to visible light. With this configuration, dust and the like is less likely to come into the housing room, resulting in less adherence of dust and the like on the reflecting optical system.

The light-transmissive member may have a function of partially reflecting and partially transmitting light incident on the light-transmissive member from the outside of the housing. In this configuration, the opening of the housing is covered with the light-transmissive member, which allows an image (i.e. light which forms the image) reflected off the reflecting optical system to be output through the light-transmissive member to the outside of the housing, as well as preventing dust and the like from coming into the housing room.

The light-transmissive member may have a glare reducing structure which reduces glare from the outer surface of the member due to the light incident on the outer surface from the outside of the housing. With this configuration, the glare reducing structure reduces the glare from the outer surface of the light-transmissive member, which allows an increase in contrast of the image that is output through the light-transmissive member to the outside of the housing.

The outer surface, of light-transmissive member, exposed to the outside of the housing may be a plane face, and the glare reducing structure may be configured such that the outer surface of the light-transmissive member is disposed to intersect obliquely with the output direction of the image reflected off the reflecting optical system. In this configuration, the glare reducing structure can be configured with the light-transmissive member, which eliminates the need for additional members to configure the glare reducing structure.

The display system may further include a background object. The background object is disposed in the direction in which light incident on the outer surface of the light-transmissive member is reflected off the outer surface. Such incident light comes from the outside of the housing reversely along the output direction in which the image is output after reflected off the reflecting optical system. The background object performs at least one of absorbing light and scattering light. This further reduces the glare from the outer surface of the light-transmissive member due to the light incident on the light-transmissive member from the outside of the housing.

The display system may further include a changeover switch that switches the orientation of the light-transmissive member between a first orientation and a second orientation. In the first orientation, the outer surface of the light-transmissive member intersects obliquely with the output direction of the image reflected off the reflecting optical system. The angle between the output direction of the image reflected off the reflecting optical system and the normal to the outer surface of the light-transmissive member is smaller in the second orientation than in the first orientation. With this configuration, the changeover switch can switch the orientation of the light-transmissive member between the first orientation and the second orientation.

The display system may further include a position adjuster that is intended to adjust the position of the display unit, in the exiting direction in which light exits from the display unit. The position adjuster can adjust the position of the display unit in the exiting direction, thereby adjusting how the image reflected off the reflecting optical system can be seen.

The reflecting optical system may include a concave mirror. With this configuration, the reflecting optical system can magnify an image, which is displayed on the display unit, and display the magnified image.

The reflecting optical system may further include an external reflecting optical system. The external reflecting optical system is disposed on the outside of the housing so as to reflect an image having been output to the outside of the housing through the opening. With this configuration, the reflecting optical system which is housed in the housing room can be made smaller while maintaining the distance from the display unit to a user at a distance in accordance with a desired apparent distance. Therefore, the housing can be downsized.

As described earlier, the display system includes the display unit and the reflecting optical system. The resolution of the display unit may be higher than the limit resolution of the image displayed at a predetermined display position by the reflecting optical system. Note that this aspect can be implemented, even alone, and not always requires any of the other aspects described above as an essential condition. With this configuration, a user who is seeing the virtual image can feel a depth and stereognostic sense of the virtual image as if the user is seeing into a real mirror. In this case, it is not always essentially required for the display system that the display unit and the reflecting optical system are housed in the housing. For example, the display unit and the reflecting optical system may be housed separately in different housings.

The electronic mirror system according to the first aspect of the present disclosure includes: the display system described above; an imaging unit which outputs a captured image; and a display controller which causes the display unit to display an image based on the captured image output from the imaging unit. This configuration allows the implementation of a small-sized electronic mirror system.

The movable-body apparatus according to the first aspect of the present disclosure includes: the electronic mirror system described above; and a body to which the electronic mirror system is mounted. In this way, the electronic mirror system small in size is mounted to the body, thereby allowing the expansion of an interior space of the movable-body apparatus.

Second Exemplary Embodiment

In a second embodiment, descriptions will be made particularly focusing on prevention of damage to a display system caused by external light such as sunlight.

(1) Outline

Figure 15:
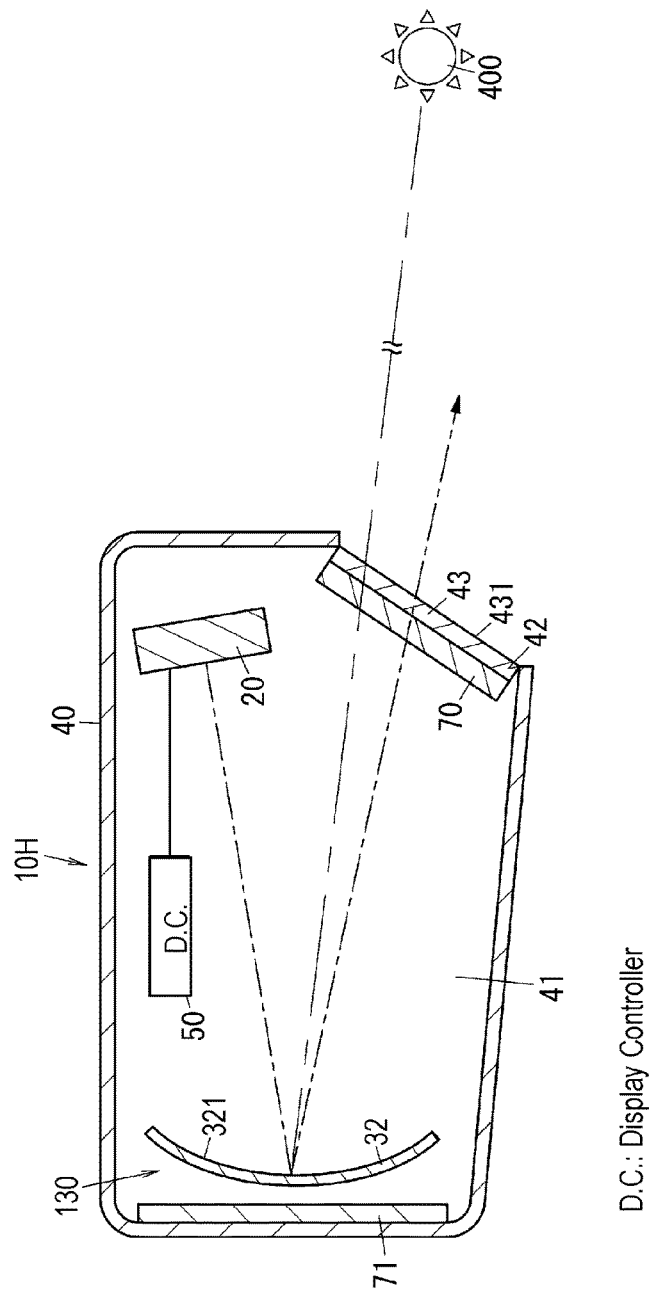
FIG. 15 is a schematic cross-sectional view showing a configuration of a display system according to a second embodiment of the present disclosure.
Figure 16:
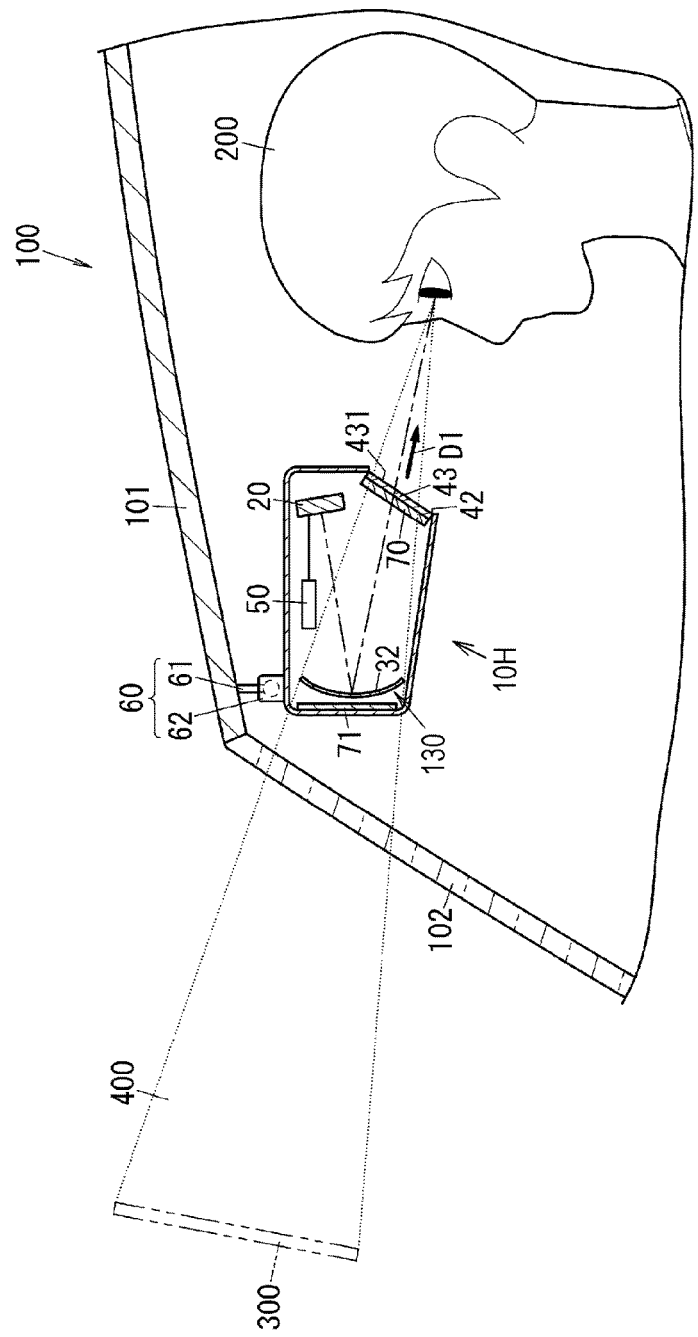
FIG. 16 is an illustrative view of a display position of an image that is displayed with the display system shown in FIG. 15.
Figure 17:
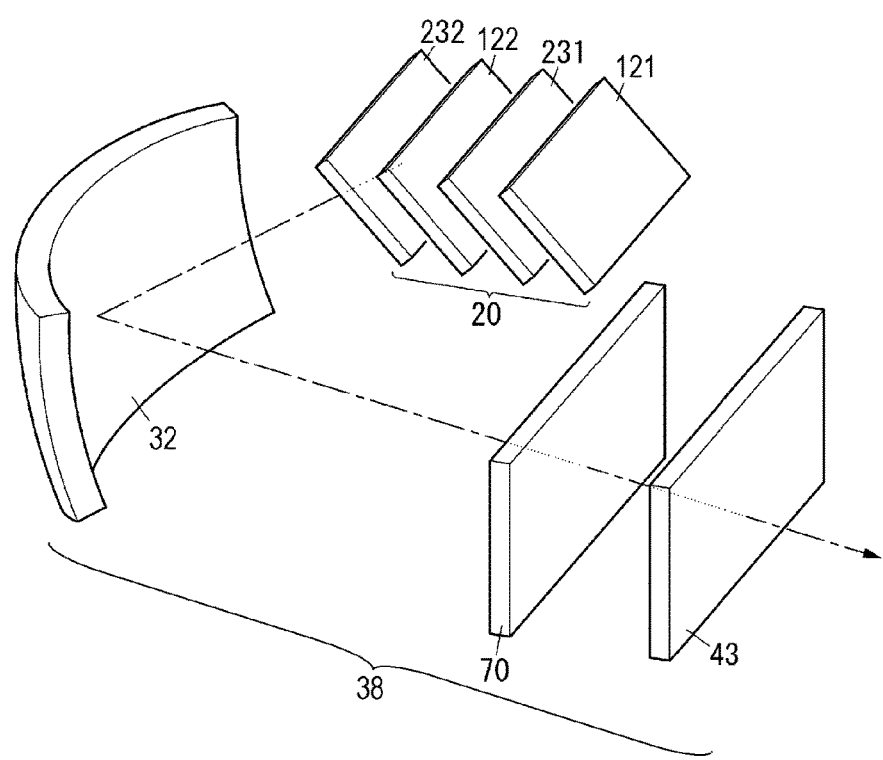
FIG. 17 is a schematic view showing a configuration of the display system shown in FIG. 15.

Display system 10H according to the embodiment is mounted to automobile 100 as a movable-body apparatus, for example, as in the case of display system 10 according to the first embodiment shown in FIG. 1. That is, display system 10H in place of display system 10 shown in FIG. 1 is mounted in automobile 100. FIG. 15 is a schematic cross-sectional view showing a configuration of display system 10H. FIG. 16 is an illustrative view of a display position of an image displayed by display system 10H. FIG. 17 is a schematic view showing the configuration of display system 10H. Display system 10H as well includes display controller 50 and, together with imaging unit 90 shown in FIG. 1, configures electronic mirror system 80.

As shown in FIGS. 15 to 17, display system 10H includes display unit 20, magnifying optical system 130, and optical attenuator 38. Optical attenuator 38 includes concave mirror 32, beam splitter 43, and polarization filter 70. Display unit 20 displays an image based on a captured image. Magnifying optical system 130 magnifies the image displayed on display unit 20 and outputs the magnified image. Optical attenuator 38 attenuates external light incident on display unit 20 through magnifying optical system 130.

According to display system 10H, upon displaying an image on display unit 20, the image displayed on display unit 20 is magnified by magnifying optical system 130. The image magnified by magnifying optical system 130 is visually recognized by user 200 (an occupant such as a driver of automobile 100).

When the external light such as sunlight is incident on display unit 20 through magnifying optical system 130 from the outside of display system 10H, the external light is condensed on display unit 20 by magnifying optical system 130. For this reason, the temperature of display unit 20 may rise locally. In the embodiment, optical attenuator 38 attenuates the external light incident on display unit 20 through magnifying optical system 130. Therefore, condensation amount of the external light onto the surface of display unit 20 caused by magnifying optical system 130 can be reduced. In accordance with display system 10H, therefore, it is possible to reduce damage to the surface of display unit 20 even in a case where sunlight from sun 400 and the like is incident into display system 10H.

The image displayed on display unit 20 is an image based on a captured image obtained by imaging unit 90. Regarding "the image based on a captured image," such a configuration is the same as that already described in the first embodiment; therefore, the duplicate explanation thereof is omitted.

(2) Detail

Hereinafter, display system 10H will be described in detail.

(2.1) Configuration

As shown in FIGS. 15 to 17, display system 10H includes display unit 20, magnifying optical system 130, and optical attenuator 38. Moreover, display system 10H according to the embodiment further includes housing 40, display controller 50, and background object 71.

The configuration of housing 40 is the same as that according to the first embodiment. In housing room 41 of housing 40, there are housed display unit 20, magnifying optical system 130, and display controller 50.

Display unit 20 is housed in an upper part of the inside of housing room 41, in the state of the display screen facing forward. As shown in FIG. 17, display unit 20 includes light source device 121, liquid crystal board 122, first polarization member 231, and second polarization member 232. Light source device 121 is used as a backlight. Light source device 121 is a so-called surface light source. Light source device 121 is a sidelight-type light source which is equipped with a solid-state light emitting element such as a light-emitting diode or a laser diode. Liquid crystal board 122 includes two rectangular glass substrates, and a liquid crystal layer sandwiched between the two rectangular glass substrates, for example. Each of first polarization member 231 and second polarization member 232 is formed in a flat-plate shape, and equal in size to liquid crystal board 122. First polarization member 231 is disposed between light source device 121 and liquid crystal board 122. Second polarization member 232 is disposed on the opposite side of liquid crystal board 122 from first polarization member 231. Each of first polarization member 231 and second polarization member 232 has a function of transmitting only light that is polarized in a specific direction (i.e. a direction along the corresponding polarizing axis). The polarizing axis of first polarization member 231 is orthogonal to the polarizing axis of second polarization member 232. Upon applying a voltage to the liquid crystal layer of liquid crystal board 122 via electrodes of display unit 20, intensity of light passing through both first polarization member 231 and second polarization member 232 is caused to vary every pixel. Then, the light of resulting-intensity is emitted from the display screen of display unit 20; the thus-emitted light forms an image.

Display controller 50 controls the state of displaying of the image displayed on display unit 20 by controlling the voltage applied to the liquid crystal layer through the electrodes of liquid crystal board 122. Display controller 50 communicates (wired or wireless communications) with imaging unit 90 via an in-vehicle network in automobile 100. The function and configuration of display controller 50 are the same as those according to the first embodiment.

Magnifying optical system 130 includes concave mirror 32. In the case shown in FIG. 15, concave mirror 32 reflects the light output from display unit 20, toward opening 42. That is, concave mirror 32 reflects the light that forms the image displayed on display unit 20. The configuration of concave mirror 32 is the same as that according to the first embodiment except that display unit 20 in the second embodiment is disposed at a position more distant from concave mirror 32 than the focal position of concave mirror 32 is. Moreover, the reflectivity of concave mirror 32 is 30% to 60%, for example; light incident on concave mirror 32 partially passes through concave mirror 32.

Magnifying optical system 130 reflects the light, which forms the image displayed on display unit 20 (i.e. output from display unit 20), and outputs the thus-reflected light through opening 42 to the outside of housing 40. As a result, user 200 can visually recognize the image (reflected image) reflected off magnifying optical system 130, through opening 42. The image reflected off magnifying optical system 130 is one obtained by magnifying the image displayed on display unit 20; therefore, user 200 can see the image displayed on display unit 20 after magnified.

In this way, because user 200 sees the image reflected off concave mirror 32 of magnifying optical system 130, user 200 sees the image displayed on display unit 20 as if the image is displayed at a virtual display position located more distant than magnifying optical system 130 in the direction in which the user can see magnifying optical system 130. That is, as shown in FIG. 16, user 200 sees virtual image 300 of the image displayed on display unit 20 as if the virtual image is displayed at a display position located a few meters, e.g. 2 to 3 meters, ahead of automobile 100.

Note that the term "output" used in the context that the image (reflected image) reflected off magnifying optical system 130 is output to the outside of housing 40 through opening 42, means the operation in which the light forming the reflected image is emitted to the outside of housing 40 through opening 42. With this configuration, user 200 can see the image reflected off magnifying optical system 130 through opening 42. Moreover, the distance to virtual image 300 that is recognized by user 200 when user 200 sees virtual image 300 is referred to as the "apparent distance," as in the case of the first embodiment. Moreover, the term "display position" of virtual image 300 means the position that is away from user 200 by the apparent distance from the user to virtual image 300, in the direction reversely parallel to arrow D1 shown in FIG. 16. The direction parallel to arrow D1 is the output direction in which the image reflected off magnifying optical system 130 is output to the outside of housing 40. That is, the "display position" is a virtual position that is recognized as if virtual image 300 is displayed at the virtual position, as shown in FIG. 16. In FIGS. 15 to 17 and FIGS. 20 to 22 illustrating various modified examples, a traveling path of light output from a point (certain pixel point) of the image displayed on the display screen of display unit 20 is schematically indicated by an alternate long and short dashed line.

The distance (apparent distance) to the display position of virtual image 300 that is output from magnifying optical system 130 is determined by the optical path length from display unit 20 to eyes of user 200. Therefore, use of magnifying optical system 130 to reflect the light output from display unit 20 allows a reduction in inner volume of housing 40 (housing room 41) while maintaining the distance to the display position of virtual image 300 at a desired distance, resulting in downsizing of housing 40.

Moreover, when external light such as sunlight enters magnifying optical system 130 from the outside of housing 40, the external light is reflected off concave mirror 32 of magnifying optical system 130 to enter display unit 20. The reflectivity of concave mirror 32 is 30% to 60%, for example; the light incident on concave mirror 32 partially passes through concave mirror 32. Accordingly, in comparison with the light incident on concave mirror 32, the light reflected off concave mirror 32 to enter display unit 20 is attenuated. That is, with this configuration, concave mirror 32 functions as an optical attenuator that attenuates external light incident on display unit 20 through magnifying optical system 130.

The lower the reflectivity of concave mirror 32, the higher the effect of attenuating external light becomes. However, decreasing the reflectivity requires an increase in luminance of display unit 20. In consideration of such a trade-off in characteristics, the reflectivity is set to 30%, for example, in the embodiment. Accordingly, concave mirror 32 as well can reduce the intensity of external light incident on display unit 20 from the outside of housing 40 through magnifying optical system 130. Therefore, a temperature rise of display unit 20 due to the external light incident on display unit 20 through magnifying optical system 130 can be suppressed.

Opening 42 of housing 40 is covered with beam splitter 43, for example. Covering opening 42 of housing 40 with beam splitter 43 causes dust and the like to be less likely to come into housing room 41 from the outside of housing 40. This results in less adherence of dust and the like on concave mirror 32 of magnifying optical system 130 that is housed in housing room 41.

Beam splitter 43 has a function of partially transmitting and partially reflecting light incident thereon. Beam splitter 43 transmits the light reflected off magnifying optical system 130 and outputs the transmitted light to the outside of housing 40. Moreover, beam splitter 43 partially transmits and partially reflects external light incident thereon from the outside of housing 40. That is, beam splitter 43 reduces intensity of the external light that enters the inside of housing 40. Therefore, in a case where external light is incident on display unit 20 through both beam splitter 43 and magnifying optical system 130, the temperature rise of display unit 20 caused by the external light is further reduced. In this way, beam splitter 43 disposed in the optical path of the external light incident on magnifying optical system 130, functions as an optical attenuator that attenuates the external light incident on display unit 20 through magnifying optical system 130.

As in the case of the first embodiment, beam splitter 43 is a half mirror, for example, that has a light transmittance of approximately 50% and a light reflectance of approximately 50%. In the embodiment as well, beam splitter 43 is disposed such that outer surface 431 intersects obliquely with the direction parallel to arrow D1 shown in FIG. 16. The direction parallel to arrow D1 indicates the output direction in which the image (i.e. the light which forms the image) reflected off magnifying optical system 130 is output to the outside of housing 40. Therefore, the glare from outer surface 431 is reduced, and contrast of the image displayed on display unit 20 is enhanced, when viewed through beam splitter 43.

Polarization filter 70 has a function of transmitting only polarized light that is polarized in a specific direction. Polarization filter 70 is equal, in dimensions in an up-down and a left-right direction, to beam splitter 43. Polarization filter 70 is disposed to be laid on an inner surface (a surface exposed to housing room 41) of beam splitter 43. Polarization filter 70 is secured on the inner surface of beam splitter 43 by bonding and the like, for example. When external light is incident on polarization filter 70 through beam splitter 43, the polarization filter functions as follows: Of the external light, only polarized light which is polarized in a direction along the polarizing axis of polarization filter 70 is allowed to pass through polarization filter 70. For this reason, in comparison with intensity of the external light incident on polarization filter 70, intensity of the external light passing through polarization filter 70 is reduced. Therefore, in a case where external light is incident on display unit 20 through both polarization filter 70 and magnifying optical system 130, the temperature rise of display unit 20 caused by the external light is further reduced. In this way, polarization filter 70, which is disposed in the optical path of the external light incident on magnifying optical system 130, functions as an optical attenuator that attenuates the external light incident on display unit 20 through magnifying optical system 130.

On the other hand, display unit 20 includes second polarization member 232. Second polarization member 232 is disposed such that second polarization member 232 and polarization filter 70 satisfy the following condition. That is, in a plane orthogonal to the optical path of the light output finally through second polarization member 232, the polarizing axis of second polarization member 232 agrees with the polarizing axis of polarization filter 70.

Note that, in the embodiment, because concave mirror 32 is disposed between display unit 20 and polarization filter 70, the polarizing axis of second polarization member 232 is not in parallel with the polarizing axis of polarization filter 70. However, such a positional relation described above allows the light passing through second polarization member 232 to pass through polarization filter 70. With this configuration, the use of polarization filter 70 as the optical attenuator makes it possible to reduce the attenuation of the light which reaches eyes of user 200 from display unit 20 while decreasing the temperature rise due to incident external light.

Note that, as shown in FIG. 16, housing 40 is hung from ceiling part 101 of automobile 100 via ball joint 60. The configuration and function of ball joint 60 are the same as those according to the first embodiment.

As shown in FIG. 15, in housing room 41 of housing 40, background object 71 is disposed at a position facing the surface (back surface) on the opposite side of concave mirror 32 from reflection surface 321. Background object 71 has a flat-plate shape. Background object 71 is approximately equal, in dimensions in an up-down direction and a left-right direction, to concave mirror 32. Background object 71 has a function of absorbing light incident thereon. The color of background object 71 is darker than that of the inner surface of housing room 41; for example, the color is black. With this configuration, intensity of light which enters the back surface of concave mirror 32 from a region where background object 71 is disposed, is reduced. Accordingly, intensity of light passing through concave mirror 32 from the back surface of concave mirror 32, is reduced. Such light includes light reflected off background object 71 after passing around concave mirror 32 and light reflected off background object 71 after passing through concave mirror 32. Therefore, contrast of the image reflected off concave mirror 32 is enhanced, resulting in ease of seeing the image (virtual image 300) reflected off concave mirror 32 for user 200.

Note that the configuration and function of imaging unit 90 are the same as those according to the first embodiment, and their duplicate explanations are omitted.

(2.2) Operation

Next, operations of electronic mirror system 80 according to the present embodiment will be described.

The operations are the same as those according to the first embodiment in that electronic mirror system 80 starts operations and causes display unit 20 to display images thereon; therefore, their duplicate explanations are omitted.

The image displayed on display unit 20 is reflected off magnifying optical system 130. The image reflected off magnifying optical system 130 is transmitted through both polarization filter 70 and beam splitter 43 and then output to the outside of housing 40. With this operation, user 200 can visually recognize, through beam splitter 43, the image reflected off magnifying optical system 130. An example of the image displayed on electronic mirror system 80 is the same as that shown in FIG. 4 described in the first embodiment.

Next, descriptions will be made regarding how user 200 can see virtual image 300, with reference to FIGS. 18A, 18B, and 19.

Magnifying optical system 130 of display system 10H is formed of concave mirror 32, as described earlier. As shown in FIGS. 18A and 18B, concave mirror 32 reflects a part of the image displayed on display unit 20. Accordingly, virtual image 300 that is formed by light reflected off magnifying optical system 130 corresponds to a part of virtual image 310 that is formed by light reflected off magnifying optical system 130 when magnifying optical system 130 reflects the entire image that is displayed on display unit 20.

Figure 18A:
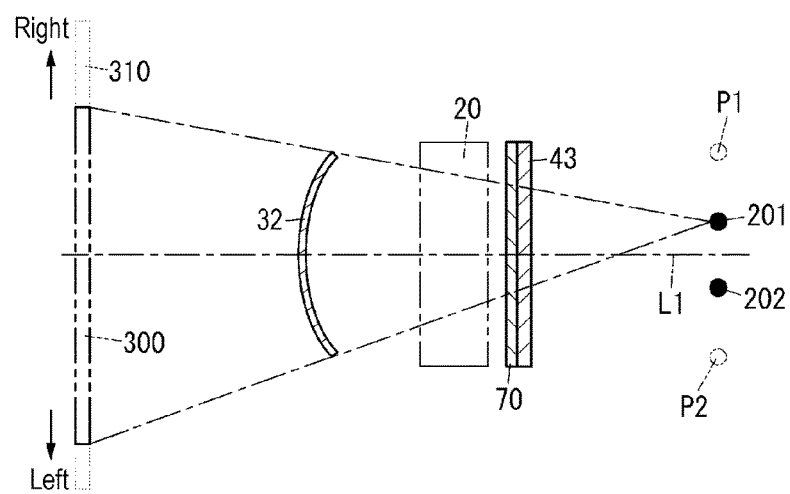
FIGS. 18A and 18B are views each illustrating a region of a virtual image that is in sight of a right eye of a user, in the display system shown in FIG. 15.
Figure 19:
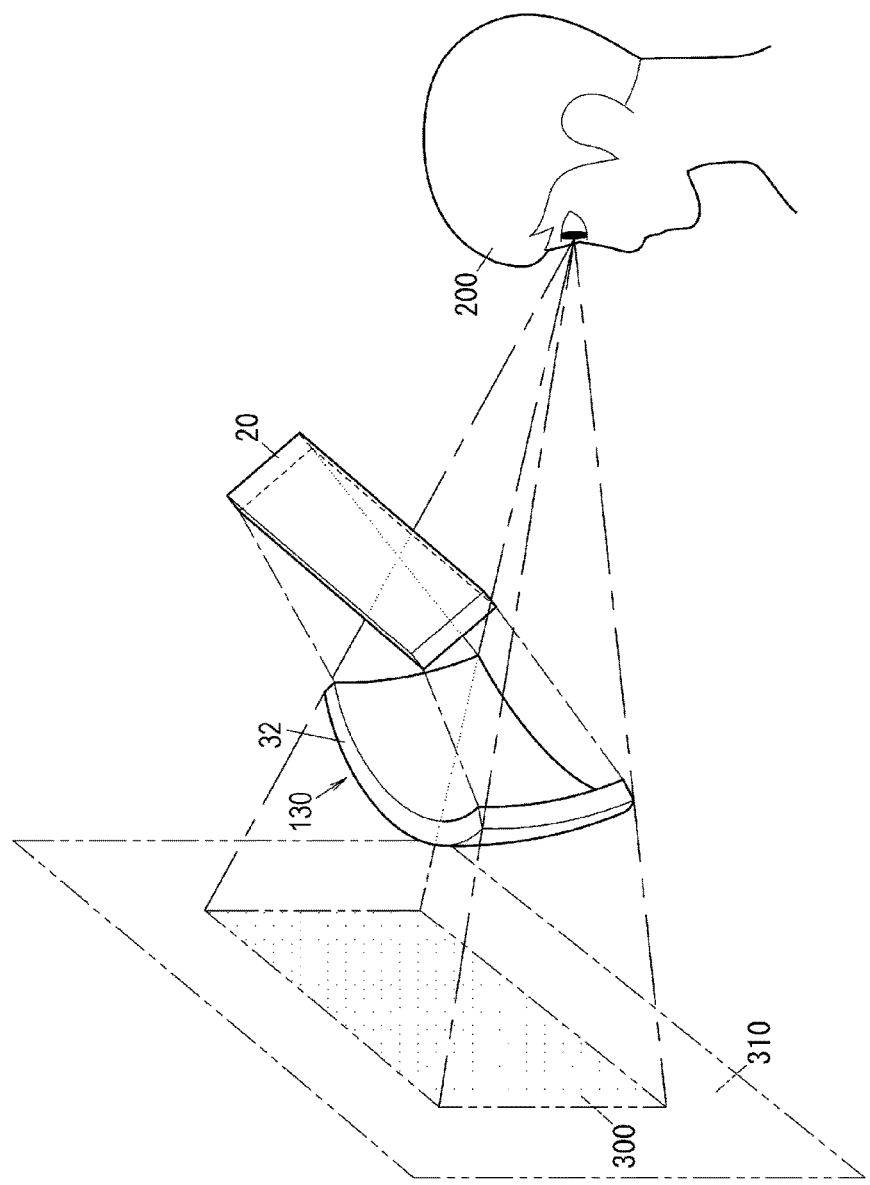
FIG. 19 is a view illustrating the region of the virtual image that is in sight of an eye of the user, in the display system shown in FIG. 15.

In the state in which user 200, being a driver, is being seated in place, actually-seeable virtual image 300 is positioned at a position corresponding to a center portion of virtual image 310 of the entire iamge, in both the up-down direction and the left-right direction (see FIGS. 18A and 19). FIG. 18A shows a region of virtual image 300 which can be seen by right eye 201 of user 200. The region corresponds to a part of virtual image 310 that is formed when the entire image displayed on display unit 20 is reflected off magnifying optical system 130. Straight line L1 shown in FIG. 18A is in parallel with the front-rear direction and passes through the midpoint between right eye 201 and left eye 202. A visual field of right eye 201 and a visual field of left eye 202 are in line symmetry with respect to straight line L1. Therefore, the region of a virtual image seeable from left eye 202 is in line symmetry with the region of virtual image 300 seeable from right eye 201 with respect to straight line L1.

Figure 18B:
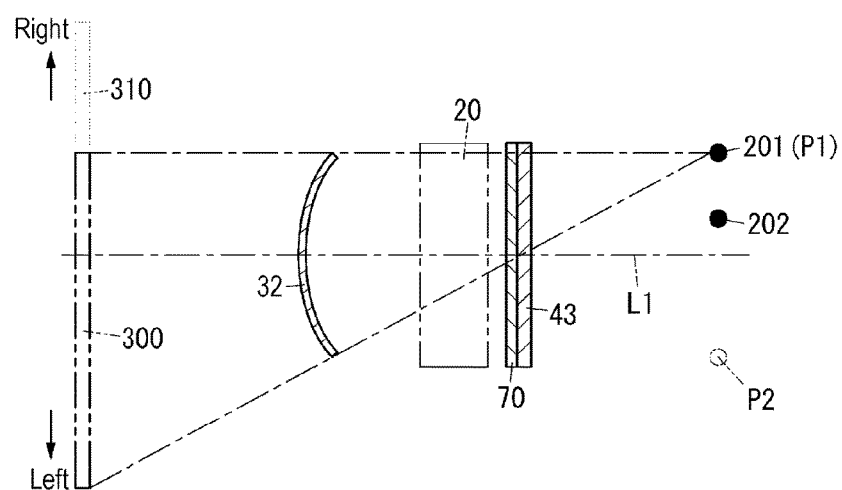

On the other hand, as shown in FIG. 18B, when the head of user 200 moves toward the right side (the upper side in FIG. 18B) relative to the head position indicated in FIG. 18A, the regions of virtual images 300 seeable from the left and right eyes of user 200 move toward the left side (the lower side in FIG. 18B). FIG. 18B shows a region of virtual image 300 seeable from right eye 201 of user 200 when right eye 201 of user 200 is positioned at position P1. In this case, the left end of virtual image 300 seeable from right eye 201 of user 200 agrees with the left end of virtual image 310.

On the contrary, when the head of user 200 moves toward the left side, the regions of the virtual images seeable from the left and right eyes move toward the right side (the upper side in FIG. 18B), following the movement of the head. When left eye 202 moves to position P2 (the position in symmetry with position P1 with respect to straight line L1), the right end of virtual image 300 seeable from left eye 202 of user 200 agrees with the right end of virtual image 310 that is formed by the entire image displayed on display unit 20.

Here, assume that the head of user 200 moves in the left-right direction, between a first position at which right eye 201 is present at position P1 and a second position at which left eye 202 is present at position P2. In this case, following the movement of the head of user 200, the region of the virtual image seeable from each of right eye 201 and left eye 202 varies.

In a case where display unit 20 is disposed on the surface of housing 40, i.e. at the position of beam splitter 43, the image displayed on display unit 20 remains unchanged even when the position of the head of user 200 moves. On the other hand, in the embodiment, when the position of the head of user 200 moves within a range between the first and second positions, the region of virtual image 300 seeable from each of right eye 201 and left eye 202 varies. With this operation, user 200 can use display system 10H shown in FIGS. 15 and 16 as if it is a mirror. Moreover, as long as the position of the head of user 200 moves within the range between the first and second positions, the frame of display unit 20 is not seen from the left and right eyes of user 200, resulting in no feeling of something uncomfortable for user 200. In other words, as long as the left and right eyes of user 200 are present within a predetermined eyebox, the frame of display unit 20 is not seen from the left and right eyes of user 200, resulting in no feeling of something uncomfortable for user 200.

In a case where the head of user 200 moves in the up-down direction, the region of virtual image 300 varies, in the up-down direction, which is seeable from each of the right and left eyes following the movement of the head, as in the case of the movement in the left-right direction. That is, an upward movement of the head of user 200 causes a downward movement of the region of virtual image 300 seeable from each of the right and left eyes, while a downward movement of the head of user 200 causes an upward movement of the region of virtual image 300 seeable from each of the right and left eyes.

Moreover, in display system 10H as well, the resolution of display unit 20 is set to a value higher than a limit resolution of virtual image 300 at the display position. The configuration and advantages of this are the same as those according to the first embodiment.

(3) Modified Examples

The embodiment described above is nothing more than an example of various embodiments of the present disclosure. The embodiment described above may be modified in accordance with designing and the like as long as the modifications can achieve an object of the present disclosure.

Hereinafter, modified examples of the embodiment will be described. The modified examples to be described below may be appropriately combined together to produce another applicable example. Note that any of the display systems according to the modified examples to be described below may be mounted to automobile 100, in place of display system 10 shown in FIG. 1. Moreover, any of the display systems according to the modified examples to be described below may include display controller 50 and, together with imaging unit 90 shown in FIG. 1, configure electronic mirror system 80.

(3.1) First Modified Example

Figure 20:
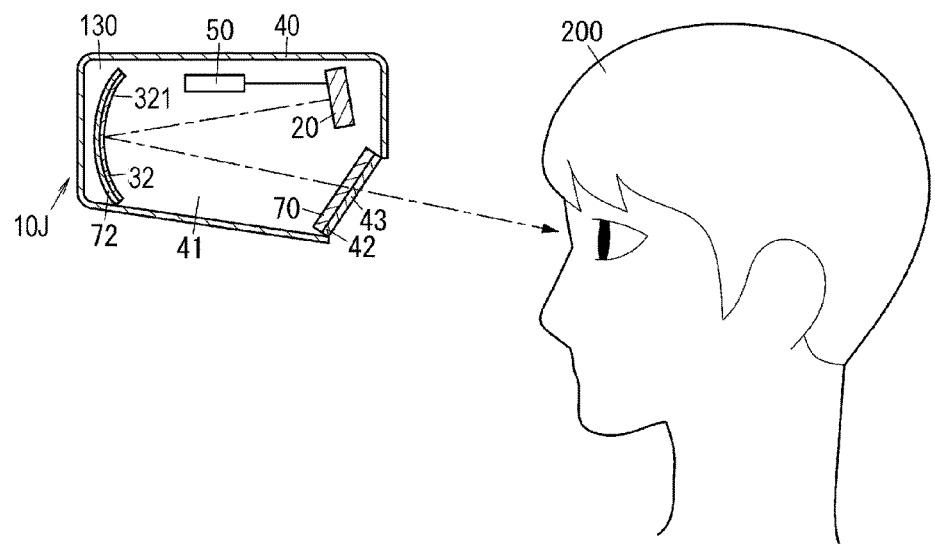
FIG. 20 is a schematic view showing a configuration of a display system according to a first modified example of the second embodiment of the present disclosure.

In display system 10H according to the embodiment described above, as shown in FIGS. 15 and 16, background object 71 is disposed at the position facing the back surface of concave mirror 32 in the inside of housing room 41. In contrast, as shown in FIG. 20, in display system 10J according to a first modified example, background object 72 is attached on the back surface (the surface on the opposite side of the concave mirror from reflection surface 321) of concave mirror 32.

Background object 72 has a function of absorbing light incident thereon. Background object 72 is a synthetic resin molding, for example. The color of background object 72 is darker than that of the inner surface of housing room 41; for example, the color is black. Background object 72 is secured on the back surface of concave mirror 32 by boding and the like, for example.

Background object 72 attached on the back surface of concave mirror 32 absorbs light, resulting in a decrease in light that passes through concave mirror 32 from the back surface of concave mirror 32. This enhances contrast of the image reflected off concave mirror 32, thus, user 200 can easily see the image (virtual image 300) displayed on display unit 20.

Instead of attaching background object 72 on the back surface of concave mirror 32, a black coating may be formed on the back surface of concave mirror 32, which also allows a decrease in the light passing through concave mirror 32 from the back surface of concave mirror 32.

Moreover, in display systems 10H and 10J, background objects 71 and 72 disposed on the opposite side of concave mirror 32 from reflection surface 321, have a function of absorbing light; however, background objects 71 and 72 may have a function of scattering light or, alternatively, both functions of absorbing and scattering light.

Background objects 71 and 72 may be each provided with a function of scattering light, by forming a fine bumpy structure on the surfaces of background objects 71 and 72 or by subjecting the surfaces of background objects 71 and 72 to a surface roughening process. Light incident on each of background objects 71 and 72 is scattered by the surface of a corresponding one of background objects 71 and 72, allowing a decrease in the light that is incident on the back surface of concave mirror 32. Moreover, a so-called moth-eye structure may be formed on the surfaces of background objects 71 and 72, thereby reducing the glare from the surfaces of background objects 71 and 72.

(3.2) Second Modified Example

In display system 10H, display unit 20 includes the two polarization members (first polarization member 231 and second polarization member 232); however, polarization filter 70 may also serve as second polarization member 232.

Figure 21:
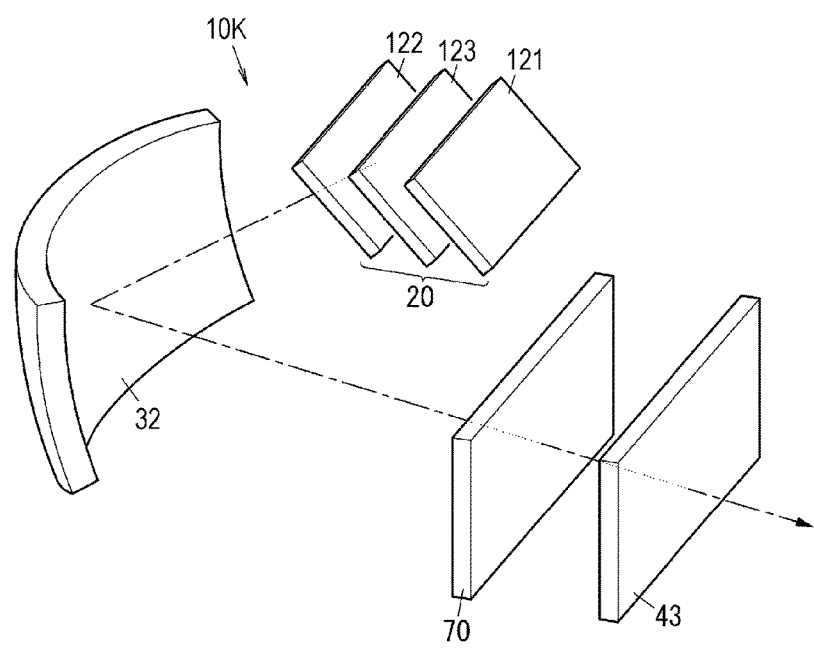
FIG. 21 is a schematic view showing a configuration of a display system according to a second modified example of the second embodiment of the disclosure.

FIG. 21 is a schematic view showing a configuration of display system 10K according to a second modified example. In display system 10K, display unit 20 includes light source device 121, liquid crystal board 122, and polarization member 123.

Polarization member 123 is disposed between liquid crystal board 122 and light source device 121. Polarization member 123 and polarization filter 70 are disposed in a positional relation in which the polarizing axis of polarization member 123 is orthogonal to the polarizing axis of polarization filter 70 in a plane orthogonal to the optical path of the light output from display unit 20 (light source device 121).

With this configuration, when display controller 50 applies a voltage to the liquid crystal layer of liquid crystal board 122 via the electrodes of liquid crystal board 122, intensity of light passing through both polarization member 123 and polarization filter 70 is caused to vary every pixel. Then, the light of resulting-intensity is emitted from polarization filter 70, thereby forming an image. In the second modified example, compared to the second embodiment, second polarization member 232 can be omitted, allowing a reduction in cost of the component. In the second modified example as well, when external light is incident from the outside of housing 40 through beam splitter 43, only polarized light of the external light is allowed to pass through polarization filter 70. The polarized light is polarized in a direction along the polarizing axis of polarization filter 70. This can reduce the intensity of the external light that enters display unit 20.

(3.3) Other Modified Examples

Optical attenuator 38 of each of display systems 10H to 10K includes all of concave mirror 32, beam splitter 43, and polarization filter 70. However, it is only required that one or two out of concave mirror 32, beam splitter 43, and polarization filter 70 be used as an optical attenuator.

Each of display systems 10H to 10K includes magnifying optical system 130 that consists of concave mirror 32. However, as shown in FIG. 22, magnifying optical system 130A formed of plane mirror 31 and concave mirror 32 may be used.

Figure 22:
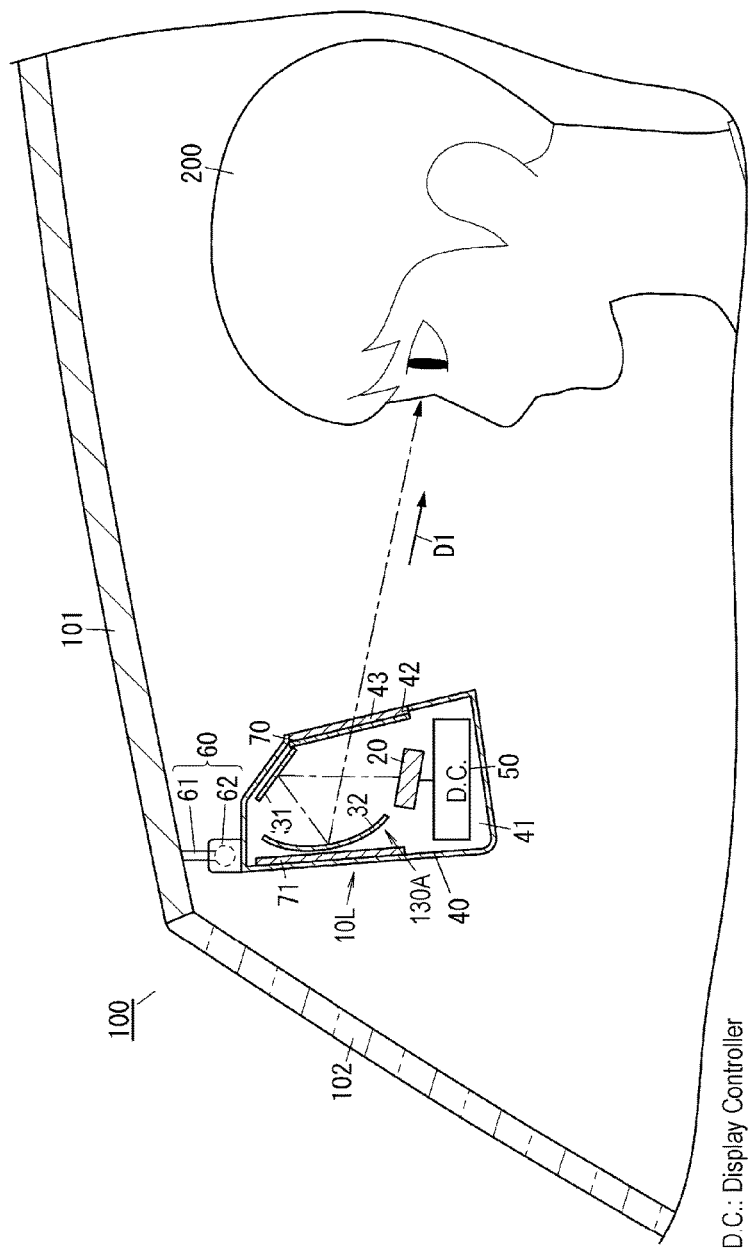
FIG. 22 is a schematic view showing a configuration of a display system according to another modified example of the second embodiment of the disclosure.

With magnifying optical system 130A of display system 10L shown in FIG. 22, the image displayed on display unit 20 is reflected and output by using both plane mirror 31 and concave mirror 32. That is, magnifying optical system 130A reflects the image two times. Accordingly, as long as the apparent distance of virtual image 300 is identical, this structure allows a reduction in the inner volume of housing room 41, compared to the case where the number of reflection times of the image is 1, resulting in downsizing of housing room 41. Note that the configurations of magnifying optical system 130 and 130A are not limited to the configurations according to the embodiment and the modified examples described above, and the configurations may be appropriately subjected to changes. The number of reflection times of light with the magnifying optical system may be one or more.

Figure 23:
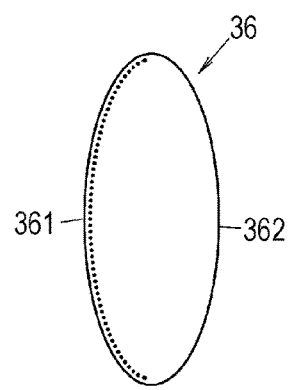
FIG. 23 is a side-elevational view of a double-convex lens disposed in another modified example of the second embodiment of the disclosure.
Figure 24:
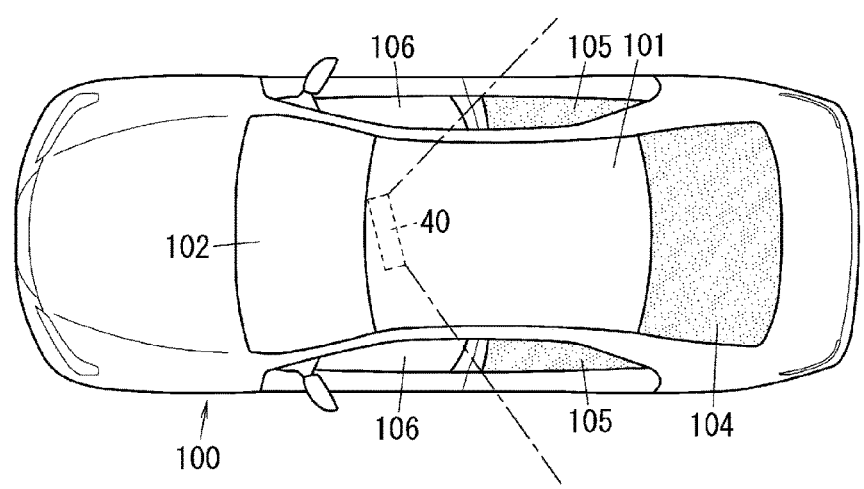
FIG. 24 is a top view of a movable-body apparatus according to the second embodiment of the present disclosure.

Moreover, in display systems 10H to 10L, each of magnifying optical systems 130 and 130A is formed of the mirrors (concave mirror 32 and plane mirror 31) only. However, each of magnifying optical systems 130 and 130A may include a convex lens. More specifically, each of magnifying optical system 130 and 130A may include a convex lens that has a function of reducing infrared light. FIG. 23 shows an example of convex lens 36 capable of being added to magnifying optical systems 130 and 130A. Convex lens 36 is disposed in the optical path in each of magnifying optical systems 130 and 130A. Convex lens 36 may be provided with a reflection coating capable of reflecting infrared light. The reflection coating may be formed on surface 361 on which light is incident from display unit 20. On the other hand, in convex lens 36, no reflection coating capable of reflecting infrared light is formed on surface 362 on the opposite side of the lens from surface 361; therefore, infrared light can pass through surface 362.

With this configuration, when external light coming from the outside of housing 40 enters the inside of convex lens 36 from surface 362 of convex lens 36, the external light is reflected by the reflection coating disposed on surface 361. Therefore, intensity of the external light that enters display unit 20 can be reduced.

Moreover, in display systems 10H to 10L according to the embodiment and the modified examples described above, the mirrors (concave mirror 32 and plane mirror 31) configuring magnifying optical systems 130 and 130A may be cold mirrors capable of reflecting visible light and transmitting infrared light. In a case where such mirrors configuring magnifying optical systems 130 and 130A are cold mirrors, most of infrared light incident from the outside of housing 40 is caused to pass through the mirrors, i.e. the cold mirrors. Thus, intensity of infrared light reflected off each of magnifying optical systems 130 and 130A to enter display unit 20 can be reduced. In a case where each of magnifying optical systems 130 and 130A includes a plurality of mirrors, if at least one of the mirrors is a cold mirror, it is possible to reduce the intensity of the infrared light reflected off the corresponding one of magnifying optical systems 130 and 130A to enter display unit 20.

Moreover, in each of display systems 10H to 10L, the light-transmissive member that covers opening 42 may be provided with a film capable of transmitting visible light and reflecting infrared light. With this configuration, even when sunlight enters opening 42, such a reflection film can reflect the entering infrared light, resulting in a decrease in intensity of infrared light such as sunlight that enters display unit 20.

Moreover, each of display systems 10H to 10L is mounted in body 110 automobile 100. There are cases where automobile 100 is such that glass capable of reducing infrared light is used for rear window 104 and side windows 105 on the rear seat side, of automobile 100. In this case, housing 40 of each of display systems 10H to 10L may be disposed at a position at which external light is allowed to enter from rear window 104 and side windows 105 on the rear seat side but less prone to enter from side windows 106 on the front seat side.

With this configuration, light which contains infrared light reduced in intensity by rear window 104 and side windows 105 on the rear seat side enters the inside of housing 40. For this reason, the intensity of the infrared light that enters display unit 20 through one of magnifying optical systems 130 and 130A is reduced. Note that, as described earlier, housing 40 is supported with ball joint 60, which allows the orientation of housing 40 to be adjustable. However, the adjustable range of the orientation of housing 40 may be restricted such that housing 40 is unable to face a direction from which external light enters through side windows 106 on the front seat side.

Moreover, although each of magnifying optical systems 130 and 130A includes one or more mirrors (concave mirror 32, plane mirror 31) that reflect light, each of magnifying optical systems 130 and 130A preferably includes an aberration correcting part for reducing aberrations. The configuration and effects of the aberration correcting part are the same as those according to the first embodiment, and their explanations are omitted.

In each of display systems 10H to 10K, display unit 20 is described as a liquid crystal display device which includes liquid crystal board 122 and light source device 121. However, as in the case of the first embodiment, display unit 20 may be a self-luminous display panel or, alternatively, may have either a configuration in which images are depicted on a screen or a configuration in which images are projected with a projector onto a screen from behind of the screen.

In each of display systems 10H to 10K, opening 42 of housing 40 is covered with beam splitter 43 permeable to visible light; however, the light-transmissive member that covers opening 42 is not limited to beam splitter 43. This is also the same as that in the first embodiment.

Each of display systems 10H to 10K is not limited to the configuration in which captured images of the rearward view of automobile 100 are displayed. For example, images may be displayed on the basis of captured images of the rearward sideview, sideward view, or forward view of automobile 100.

Electronic mirror systems 80 each of which includes a corresponding one of display systems 10H to 10K are applicable not only to automobiles 100, but also to movable-body apparatuses other than automobiles 100, which include two-wheeled vehicles, electric trains, aircraft, construction equipment, and vessels, for example.

Moreover, each of display systems 10H to 10K may be configured with not only one device but also a plurality of devices. That is, the functions of each of display systems 10H to 10K may be decentralized and provided in not smaller than two devices. Display controller 50 may be disposed in an ECU of automobile 100 or a server apparatus on the outside of automobile 100. In this case, the ECU or server apparatus is used to produce images to be displayed on display unit 20.

(4) Summary

As described above, the display system according to a second aspect of the present disclosure includes a display unit, a magnifying optical system, and an optical attenuator. The display unit displays an image based on a captured image. The magnifying optical system magnifies the image displayed on the display unit and outputs the magnified image. The optical attenuator attenuates external light that is incident on the display unit through the magnifying optical system.

With the display system, the optical attenuator attenuates the external light, thus intensity of the outside light that is condensed on the surface of the display unit by the magnifying optical system can be decreased. Therefore, it is possible to reduce damage to the surface of the display unit even in cases where sunlight or the like is incident on the display system.

Note that the magnifying optical system may include a mirror having a reflection surface and the optical attenuator may be configured with the mirror. In this configuration, the mirror of the magnifying optical system may also serve as the optical attenuator.

Moreover, on the opposite side of the mirror of the magnifying optical system from the reflection surface, a background object may be disposed which performs at least one of light absorption and light scattering. The absorption or scattering of light by the background object allows intensity of the light that enters the mirror from behind thereof to be reduced. Therefore, contrast of the image that is reflected off the mirror can be enhanced.

The optical attenuator may be disposed in the optical path of the external light incident on the magnifying optical system. Even with such an arrangement, the optical attenuator can reduce the external light that enters the magnifying optical system.

The optical attenuator may be a beam splitter that partially reflects and partially transmits external light incident on the magnifying optical system. The beam splitter transmits a part of the light incident thereon, which causes the light to be attenuated before it enters the magnifying optical system.

Alternatively, the optical attenuator may be a polarization filter. The polarization filter can transmit only light polarized in a direction along the polarizing axis of the filter, thereby reducing the light passing through it. Therefore, the external light which enters the display unit through the magnifying optical system can be attenuated.

In a case where the optical attenuator is the polarization filter, the display unit may include a light source device, a liquid crystal board, a first polarization member, and a second polarization member. The light source device emits light. On the liquid crystal board, the light emitted from the light source device is incident. The first polarization member is disposed between the light source device and the liquid crystal board. The second polarization member is disposed on the opposite side of the liquid crystal board from the first polarization member. The polarizing axis of the first polarization member is orthogonal to the polarizing axis of the second polarization member. Then, the polarization filter is disposed in a positional relation in which the polarizing axis of the polarization filter agrees with the polarizing axis of the second polarization member in a plane orthogonal to a path of the light output from the display unit. In this case, the polarizing axis of the light reflected off the reflecting optical system after passing through the second polarization member agrees with the polarizing axis of the polarization filter. With this configuration, it is possible to prevent the light passing through the polarization filter from being further attenuated by the second polarization member.

In a case where the optical attenuator is the polarization filter, the display unit may include a light source device, a liquid crystal board, and a polarization member. The light source device emits light. On the liquid crystal board, the light emitted from the light source device is incident. The polarization member is disposed between the light source device and the liquid crystal board. Then, the polarization filter is disposed in a positional relation in which the polarizing axis of the polarization filter is orthogonal to the polarizing axis of the polarization member in a plane orthogonal to a path of the light output from the display unit. In this case, the polarizing axis of the light reflected off the reflecting optical system after passing through the liquid crystal board agrees with the polarizing axis of the polarization filter. With this configuration, the polarization filter may also serve as another polarization member disposed on the front side of the liquid crystal board.

The magnifying optical system may include a concave mirror. With this configuration, the magnifying optical system can magnify the image displayed on the display unit.

As described earlier, the display system includes the display unit and the magnifying optical system. The resolution of the display unit may be higher than the limit resolution of an image displayed at a predetermined display position by the magnifying optical system. Note that this aspect can be implemented, even alone, and not always requires any of the other aspects described above as an essential condition. With this configuration, a user who is seeing the virtual image can feel a depth and stereognostic sense of the virtual image as if the user is seeing into a real mirror. In this case, the optical attenuator is not essential in the configuration of the display system.

The electronic mirror system according to the second aspect of the present disclosure includes the display system described above, an imaging unit that outputs a captured image, and a display controller that causes the display unit to display an image based on the captured image output from the imaging unit. With this configuration, it is possible to attenuate external light which is condensed on the surface of the display unit by the magnifying optical system.

The movable-body apparatus according to the second aspect of the present disclosure includes the electronic mirror system described above, and a body to which the electronic mirror system described above is mounted. With this configuration, it is possible to provide the movable-body apparatus in which the electronic mirror system is mounted. The electronic mirror system can attenuate external light which is condensed on the surface of the display unit by the magnifying optical system.

Note that the configuration of the first embodiment may be combined with the configuration of the second embodiment. That is, in a case where the reflecting optical system according to the first embodiment includes concave mirror 32, beam splitter 43 may serves as the light-transmissive member according to the first embodiment and also serves, simultaneously, as the optical attenuator according to the second embodiment. Alternatively, polarization filter 70 according to the second embodiment may be added to the configuration according to the first embodiment. Moreover, at least any one of mirrors according to the first embodiment, namely, concave mirror 32, plane mirror 31, and convex mirror 33, which configure the reflecting optical system, may also be used to function as the optical attenuator.

What is claimed is:

1. A display system comprising:
   a display configured to display an image based on a captured image;
   a housing that houses the display, the housing having an opening;
   a reflecting optical system housed in the housing, the reflecting optical system reflecting the image displayed on the display so as to output the reflected image through the opening of the housing to an outside of the housing;
   a light-transmissive cover that covers the opening;
   a protrusion extending away from the housing towards a position of a vehicle driver; and
   an optical element that performs at least one of absorbing light or scattering light, the optical element being affixed to an inner surface of the protrusion.

2. The display system according to claim 1, wherein the light-transmissive cover is permeable to visible light.

3. The display system according to claim 2,
   wherein the light-transmissive cover partially reflects and partially transmits incident-light that is incident on the light-transmissive cover from the outside of the housing.

4. The display system according to claim 3,
   wherein the light-transmissive cover has a glare reducing structure that reduces glare of the incident-light from an outer surface of the light-transmissive cover.

5. The display system according to claim 4,
   wherein the outer surface of the light-transmissive cover is a plane face, and
   the glare reducing structure is configured such that the outer surface of the light-transmissive cover is disposed so as to obliquely intersect with an output direction of the image reflected by the reflecting optical system.

6. The display system according to claim 1,
   wherein the reflecting optical system includes an aberration correcting part configured to correct an aberration.

7. The display system according to claim 1, further comprising a position adjuster configured to adjust a position of the display in a light-exiting direction in which the display emits light.

8. The display system according to claim 1, further comprising an external reflecting optical system disposed on the outside of the housing, the external reflecting optical system being configured to reflect the image output to the outside of the housing through the opening.

9. An electronic mirror system comprising:
   the display system according to claim 1;
   an imaging sensor configured to output the captured image; and
   a display controller configured to cause the display to display the image based on the captured image output from the imaging sensor.

10. A movable-body apparatus comprising:
    the electronic mirror system according to claim 9; and
    a body to which the electronic mirror system is mounted.

11. The display system according to claim 1, wherein:
    the protrusion includes an upper plate which protrudes rearward from an upper-side portion of the opening, and side plate which protrudes rearward from a side portion of the opening, and
    the optical element is attached on an inner surface of the upper plate.

12. The display system according to claim 1, wherein the optical element has a flat shape.

13. The display system according to claim 1, wherein a dimension in a lateral direction of the optical element is either equal to or larger than a dimension in a lateral direction of light-transmissive cover.

14. The display system according to claim 11, wherein a color of the optical element is darker than a color of the inner surface of the upper plate.

15. The display system according to claim 1, wherein light reflected by an outer surface of the light-transmissive cover is incident on the optical element, and is reflected along an output direction reverse to a direction of the image reflected by the reflective optical system.

* * * * *